United States Patent
Uchida et al.

(10) Patent No.: US 9,172,882 B2
(45) Date of Patent: Oct. 27, 2015

(54) ZOOM LENS SYSTEM, INTERCHANGEABLE LENS APPARATUS AND CAMERA SYSTEM

(71) Applicant: Panasonic Corporation, Osaka (JP)

(72) Inventors: Tsuneo Uchida, Chiba (JP); Satoshi Kuzuhara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 14/183,734

(22) Filed: Feb. 19, 2014

(65) Prior Publication Data

US 2014/0240554 A1  Aug. 28, 2014

(30) Foreign Application Priority Data

Feb. 22, 2013 (JP) ................................ 2013-032869
Jan. 7, 2014 (JP) ................................ 2014-001028

(51) Int. Cl.
*G02B 27/64* (2006.01)
*G02B 15/14* (2006.01)
(Continued)

(52) U.S. Cl.
CPC .......... *H04N 5/23296* (2013.01); *G02B 15/173* (2013.01); *G02B 15/22* (2013.01); *G02B 27/646* (2013.01); *H04N 5/238* (2013.01); *H04N 5/23209* (2013.01); *H04N 5/23212* (2013.01)

(58) Field of Classification Search
CPC ........ G02B 15/00; G02B 15/14; G02B 15/15; G02B 15/16; G02B 15/163; G02B 15/167; G02B 15/17; G02B 15/173; G02B 15/20; G02B 15/22; G02B 15/24; G02B 15/26; G02B 15/28; G02B 27/64; G02B 27/646
See application file for complete search history.

(56) References Cited

U.S. PATENT DOCUMENTS 6,285,501 B1    9/2001  Suzuki
6,650,475 B1 *  11/2003  Hamano ...................... 359/557
(Continued)

FOREIGN PATENT DOCUMENTS

JP    10-221600    8/1998
JP    2000-214386  8/2000
(Continued)

*Primary Examiner* — Thong Nguyen
(74) *Attorney, Agent, or Firm* — Wenderoth, Lind & Ponack, L.L.P.

(57) ABSTRACT

A zoom lens system comprising a positive first lens unit composed of three or four lens elements, a negative second lens unit, and subsequent lens units, wherein the subsequent lens units include an aperture diaphragm, an image blur compensating lens unit, and a focusing lens unit, which are provided on the image side relative to the aperture diaphragm, and the conditions: $1.8<|(Y_W/f_W) \times F_{NOT} \times (f_T/f_W)|<4.5$ and $0.001<(D_{1W}+D_{2T})/f_W<0.200$ ($Y_W = f_W \times \tan(\omega_W)$, $f_W$, $f_T$: focal length of the zoom lens system at wide-angle limit, telephoto limit, $\omega_W$: half view angle at wide-angle limit, $F_{NOT}$: F-number at telephoto limit, $D_{1W}$: inter-apex distance between the first and second lens units at wide-angle limit, $D_{2T}$: inter-apex distance between the second lens unit and a most object side lens unit among the subsequent lens units at telephoto limit) are satisfied.

14 Claims, 22 Drawing Sheets

(51) Int. Cl.
*H04N 5/232* (2006.01)
*G02B 15/22* (2006.01)
*G02B 15/173* (2006.01)
*H04N 5/238* (2006.01)

(56) References Cited

U.S. PATENT DOCUMENTS 6,999,241 B2 * 2/2006 Yamada et al. ............... 359/686
2009/0174951 A1 7/2009 Hankawa et al.
2009/0251781 A1 * 10/2009 Adachi et al. ............... 359/557
2011/0122506 A1 * 5/2011 Ito ............................... 359/683
2011/0261250 A1 10/2011 Touchi et al.
2012/0113516 A1 * 5/2012 Kimura ........................ 359/557
2012/0236418 A1 9/2012 Yamano

FOREIGN PATENT DOCUMENTS

| | | |
|---|---|---|
| JP | 2009-163102 | 7/2009 |
| JP | 2011-232543 | 11/2011 |
| JP | 2012-194279 | 10/2012 |

* cited by examiner

ZOOM LENS SYSTEM, INTERCHANGEABLE LENS APPARATUS AND CAMERA SYSTEM

CROSS-REFERENCE TO RELATED APPLICATION

This application is based on application No. 2013-032869 filed in Japan on Feb. 22, 2013 and application No. 2014-001028 filed in Japan on Jan. 7, 2014, the contents of which are hereby incorporated by reference.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Japanese Laid-Open Patent Publication No. 2011-232543 discloses a zoom lens having a five-unit configuration of positive, negative, positive, negative, and positive, in which air spaces between first to third lens units are varied to change magnification, and a lens unit provided on an image side relative to an aperture diaphragm moves along an optical axis at the time of focusing.

Japanese Laid-Open Patent Publication No. 2000-214386 discloses a zoom lens having a long back focal length, and a five-unit configuration of positive, negative, negative, positive, and positive, in which image blur compensation is performed by using a lens unit comprising the entirety or part of a fourth lens unit.

Japanese Laid-Open Patent Publication No. 2012-194279 discloses a zoom lens having a five-unit configuration of positive, negative, positive, positive, and positive, in which, at the time of magnification change, a first lens unit moves to an object side so as to be apart from a second lens unit, a third lens unit moves to the object side so as to be close to the second lens unit, and a fourth lens unit moves to the object side so as to be close to the third lens unit.

Japanese Laid-Open Patent Publication No. 10-221600 discloses a zoom lens having a four-unit configuration of positive, negative, positive, and negative, in which, in a close-object in-focus condition, a first lens unit is moved to an object side, a third lens unit is moved to the object side, and a fourth lens unit is moved to an image side.

Japanese Laid-Open Patent Publication No. 2009-163102 discloses a zoom lens having a four-unit configuration of positive, negative, positive, and negative, and including an aperture diaphragm between a most image side lens surface of a second lens unit and a most image side lens surface of a third lens unit.

SUMMARY

The present disclosure provides a compact zoom lens system capable of lightweight focusing, and having excellent imaging performance. Further, the present disclosure provides an interchangeable lens apparatus and a camera system each employing the zoom lens system.

The novel concepts disclosed herein were achieved in order to solve the foregoing problems in the related art, and herein is disclosed:

a zoom lens system, in order from an object side to an image side, comprising:
a first lens unit having positive optical power;
a second lens unit having negative optical power; and
subsequent lens units, wherein
the first lens unit is composed of three or four lens elements,
the zoom lens system being provided with:
an aperture diaphragm;
an image blur compensating lens unit composed of one or more lens elements, which moves in a direction perpendicular to an optical axis to optically compensate image blur; and
a focusing lens unit composed of one or more lens elements, which moves along the optical axis in focusing from an infinity in-focus condition to a close-object in-focus condition, wherein
the subsequent lens units include the aperture diaphragm, the image blur compensating lens unit, and the focusing lens unit,
the image blur compensating lens unit and the focusing lens unit are provided on the image side relative to the aperture diaphragm, and
the following conditions (1) and (2) are satisfied:

$$1.8 < |(Y_W/f_W) \times F_{NOT} \times (f_T/f_W)| < 4.5 \quad (1)$$

$$0.001 < (D_{1W} + D_{2T})/f_W < 0.200 \quad (2)$$

where
$Y_W$ is a diagonal image height at a wide-angle limit, which is expressed by the following equation:

$$Y_W = f_W \times \tan(\omega_W),$$

$f_W$ is a focal length of the zoom lens system at the wide-angle limit,
$f_T$ is a focal length of the zoom lens system at a telephoto limit,
$\omega_W$ is a half view angle at the wide-angle limit,
$F_{NOT}$ is F-number at the telephoto limit,
$D_{1W}$ is an inter-apex distance between the first lens unit and the second lens unit at the wide-angle limit, and
$D_{2T}$ is an inter-apex distance between the second lens unit and a lens unit provided closest to the object side among the subsequent lens units at the telephoto limit.

The novel concepts disclosed herein were achieved in order to solve the foregoing problems in the related art, and herein is disclosed:

an interchangeable lens apparatus comprising:
a zoom lens system; and
a lens mount section which is connectable to a camera body including an image sensor for receiving an optical image formed by the zoom lens system and converting the optical image into an electric image signal,
the zoom lens system, in order from an object side to an image side, comprising:
a first lens unit having positive optical power;
a second lens unit having negative optical power; and
subsequent lens units, wherein
the first lens unit is composed of three or four lens elements,
the zoom lens system being provided with:
an aperture diaphragm;

an image blur compensating lens unit composed of one or more lens elements, which moves in a direction perpendicular to an optical axis to optically compensate image blur; and a focusing lens unit composed of one or more lens elements, which moves along the optical axis in focusing from an infinity in-focus condition to a close-object in-focus condition, wherein the subsequent lens units include the aperture diaphragm, the image blur compensating lens unit, and the focusing lens unit, the image blur compensating lens unit and the focusing lens unit are provided on the image side relative to the aperture diaphragm, and the following conditions (1) and (2) are satisfied:

$$1.8 < |(Y_W/f_W) \times F_{NOT} \times (f_T/f_W)| < 4.5 \quad (1)$$

$$0.001 < (D_{1W} + D_{2T})/f_W < 0.200 \quad (2)$$

where $Y_W$ is a diagonal image height at a wide-angle limit, which is expressed by the following equation:

$$Y_W = f_W \times \tan(\omega_W),$$

$f_W$ is a focal length of the zoom lens system at the wide-angle limit, $f_T$ is a focal length of the zoom lens system at a telephoto limit, $\omega_W$ is a half view angle at the wide-angle limit, $F_{NOT}$ is F-number at the telephoto limit, $D_{1W}$ is an inter-apex distance between the first lens unit and the second lens unit at the wide-angle limit, and $D_{2T}$ is an inter-apex distance between the second lens unit and a lens unit provided closest to the object side among the subsequent lens units at the telephoto limit.

The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, the zoom lens system, in order from an object side to an image side, comprising:

a first lens unit having positive optical power;

a second lens unit having negative optical power; and subsequent lens units, wherein the first lens unit is composed of three or four lens elements, the zoom lens system being provided with:

an aperture diaphragm;

an image blur compensating lens unit composed of one or more lens elements, which moves in a direction perpendicular to an optical axis to optically compensate image blur; and a focusing lens unit composed of one or more lens elements, which moves along the optical axis in focusing from an infinity in-focus condition to a close-object in-focus condition, wherein the subsequent lens units include the aperture diaphragm, the image blur compensating lens unit, and the focusing lens unit, the image blur compensating lens unit and the focusing lens unit are provided on the image side relative to the aperture diaphragm, and the following conditions (1) and (2) are satisfied:

$$1.8 < |(Y_W/f_W) \times F_{NOT} \times (f_T/f_W)| < 4.5 \quad (1)$$

$$0.001 < (D_{1W} + D_{2T})/f_W < 0.200 \quad (2)$$

where $Y_W$ is a diagonal image height at a wide-angle limit, which is expressed by the following equation:

$$Y_W = f_W \times \tan(\omega_W),$$

$f_W$ is a focal length of the zoom lens system at the wide-angle limit, $f_T$ is a focal length of the zoom lens system at a telephoto limit, $\omega_W$ is a half view angle at the wide-angle limit, $F_{NOT}$ is F-number at the telephoto limit, $D_{1W}$ is an inter-apex distance between the first lens unit and the second lens unit at the wide-angle limit, and $D_{2T}$ is an inter-apex distance between the second lens unit and a lens unit provided closest to the object side among the subsequent lens units at the telephoto limit.

The zoom lens system according to the present disclosure is compact, capable of lightweight focusing, and excellent in imaging performance.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
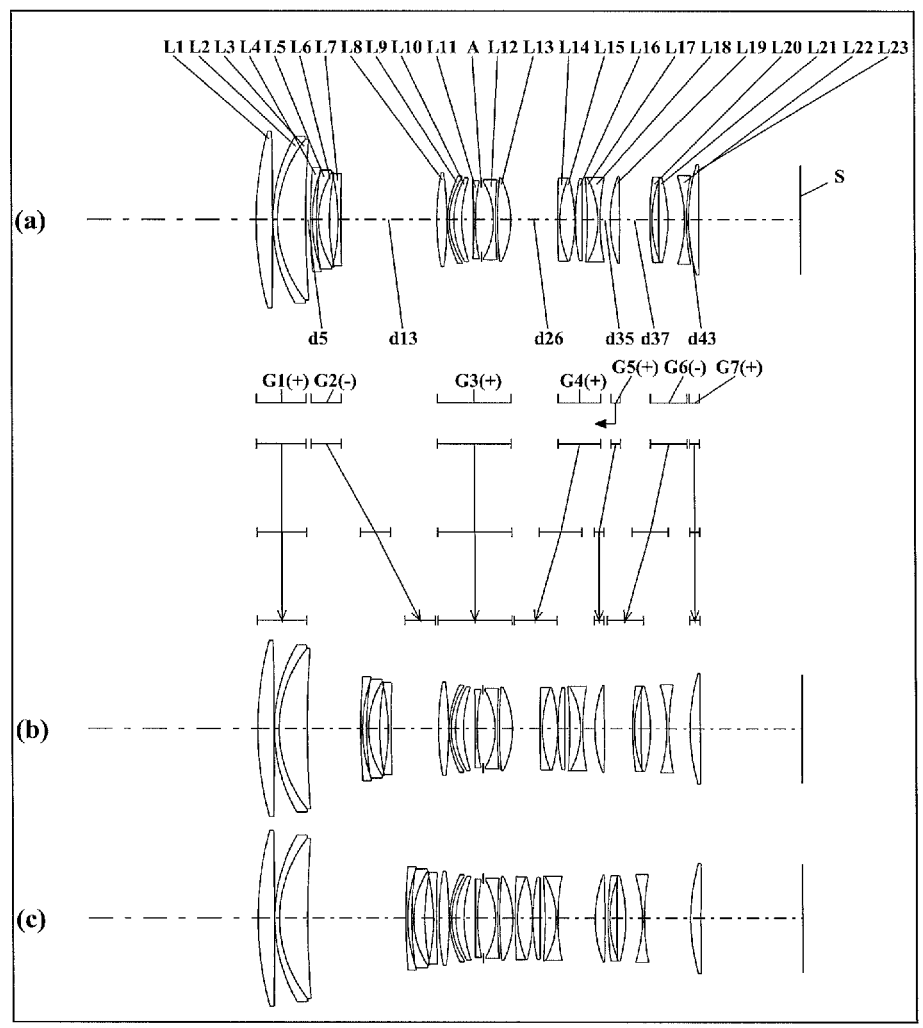
FIG. 1 is a lens arrangement diagram showing an infinity in-focus condition of a zoom lens system according to Embodiment 1 (Numerical Example 1)
Figure 2:
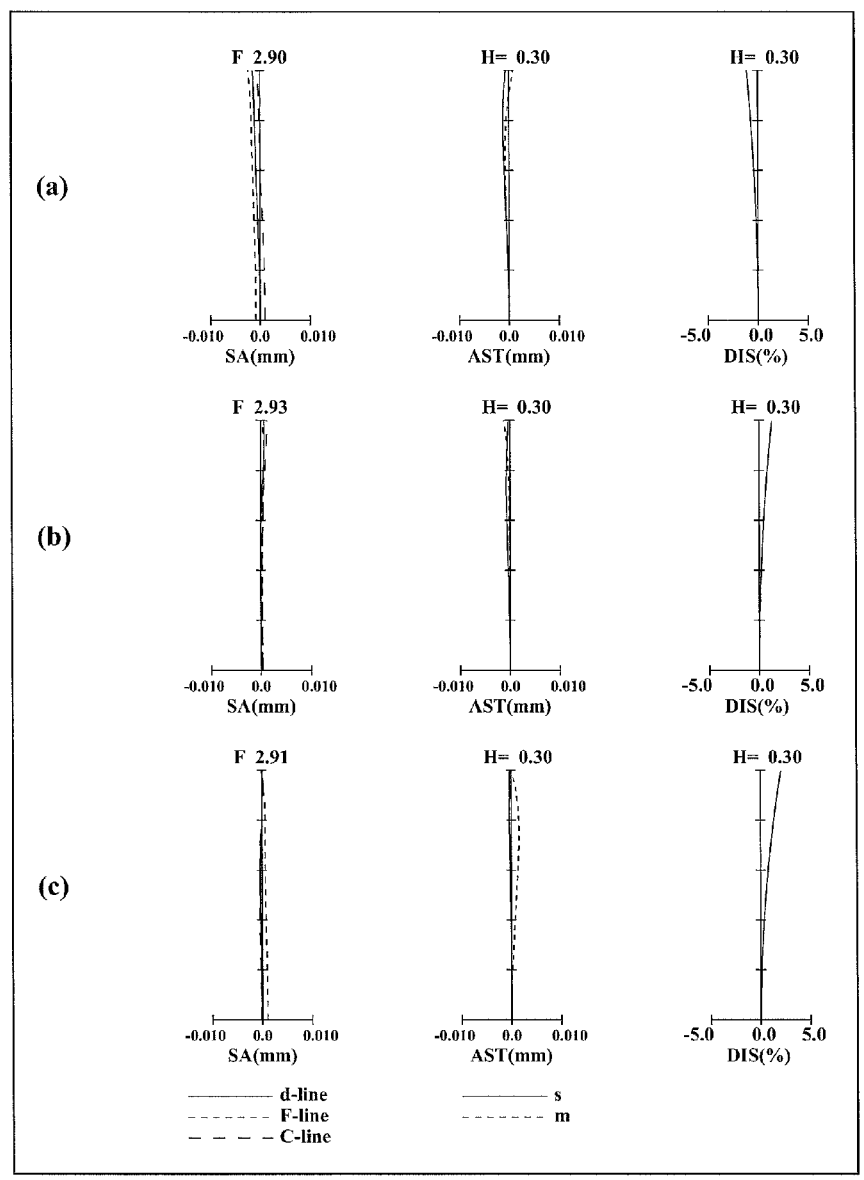
FIG. 2 is a longitudinal aberration diagram of an infinity in-focus condition of the zoom lens system according to Numerical Example 1.
Figure 3:
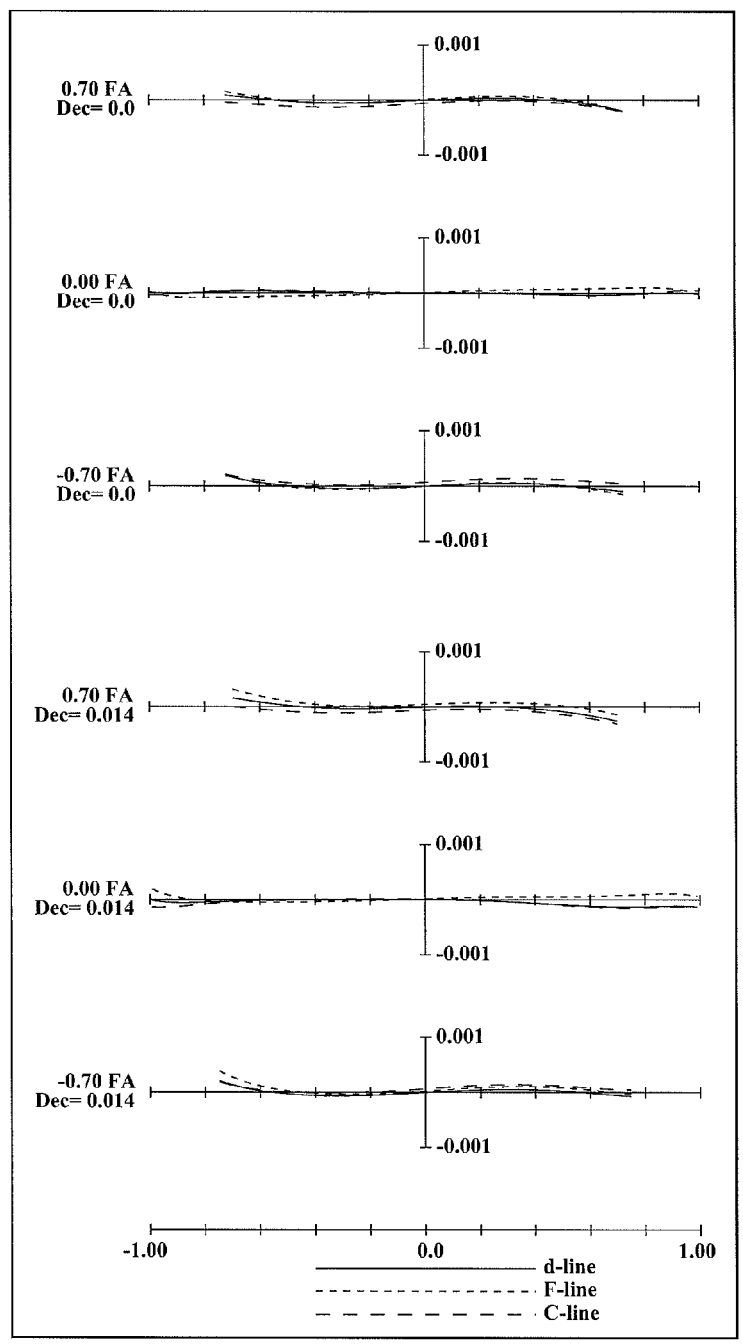
FIG. 3 is a lateral aberration diagram of the zoom lens system according to Numerical Example 1 at a telephoto limit in a basic state where image blur compensation is not performed and in an image blur compensation state.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 7

FIGS. 1, 4, 7, 10, 13, 16, and 19 are lens arrangement diagrams of zoom lens systems according to Embodiments 1 to 7, respectively. Each zoom lens system is in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow provided between part (a) and part (b) indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and therefore this line does not indicate actual motion of each lens unit.

In each Fig., an arrow imparted to a lens unit indicates focusing from an infinity in-focus condition to a close-object in-focus condition. That is, the arrow indicates a direction along which a focusing lens unit composed of one or more lens elements moves in focusing from an infinity in-focus condition to a close-object in-focus condition. In each Fig., since the symbols of the respective lens units are imparted to part (a), the arrow indicating focusing is placed beneath each symbol of each lens unit for the convenience sake. However, the direction along which each lens unit moves in focusing in each zooming condition will be hereinafter described in detail for each embodiment.

Each of the zoom lens systems according to Embodiments 1, 2, 4, 6 and 7, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having positive optical power, a sixth lens unit G6 having negative optical power, and a seventh lens unit G7 having positive optical power. In the zoom lens systems according to Embodiments 1, 2, 4, 6 and 7, in zooming, the respective lens units individually move along the optical axis such that the intervals between the respective lens units vary. In the zoom lens systems according to Embodiments 1, 2, 4, 6 and 7, these lens units are arranged in a desired optical power allocation, whereby size reduction of the entire lens system is achieved while maintaining high optical performance.

The zoom lens system according to Embodiment 3, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, a sixth lens unit G6 having negative optical power, and a seventh lens unit G7 having positive optical power. In the zoom lens system according to Embodiment 3, in zooming, the respective lens units individually move along the optical axis such that the intervals between the respective lens units vary. In the zoom lens system according to Embodiment 3, these lens units are arranged in a desired optical power allocation, whereby size reduction of the entire lens system is achieved while maintaining high optical performance.

The zoom lens system according to Embodiment 5, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having positive optical power, a sixth lens unit G6 having negative optical power, a seventh lens unit G7 having negative optical power, an eighth lens unit G8 having positive optical power, and a ninth lens unit G9 having negative optical power. In the zoom lens system according to Embodiment 5, in zooming, the respective lens units individually move along the optical axis such that the intervals between the respective lens units vary. In the zoom lens system according to Embodiment 5, these lens units are arranged in a desired optical power allocation, whereby size reduction of the entire lens system is achieved while maintaining high optical performance.

In each Fig., symbol (+) or (−) imparted to the symbol of each lens unit corresponds to the sign of the optical power of the lens unit. Further, in each Fig., a straight line located on the most right-hand side indicates the position of an image surface S.

Figure 4:
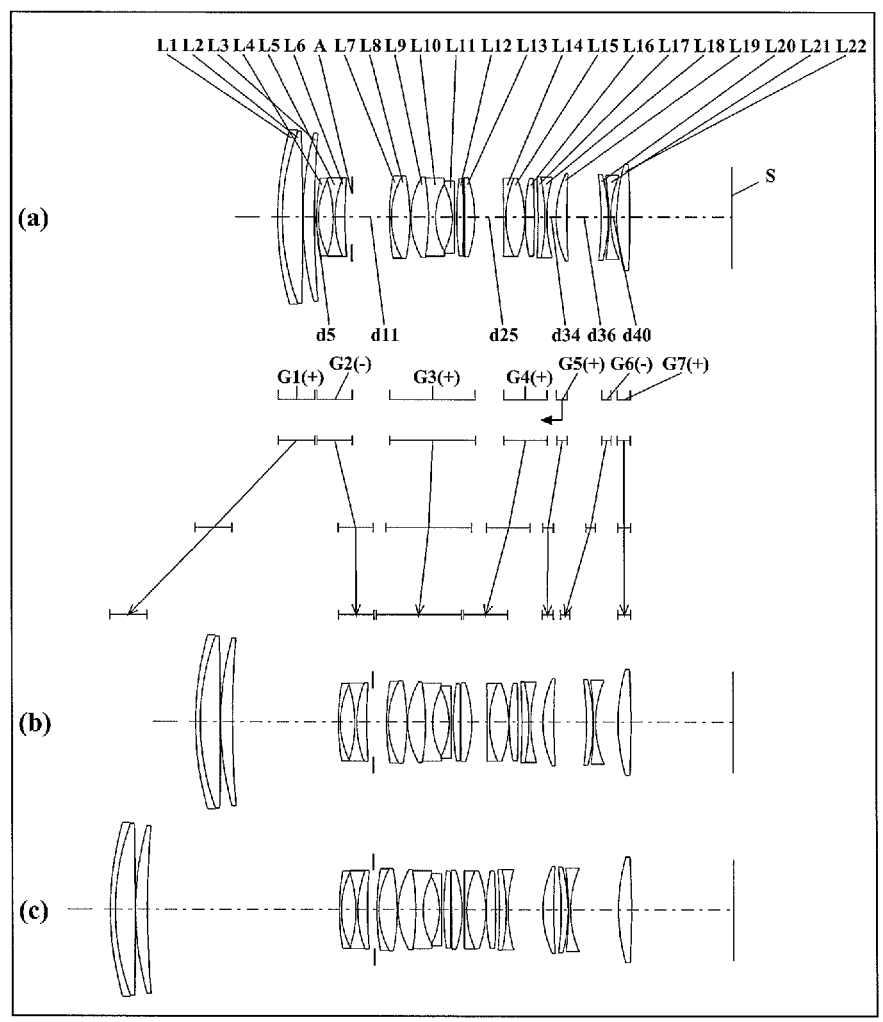
FIG. 4 is a lens arrangement diagram showing an infinity in-focus condition of a zoom lens system according to Embodiment 2 (Numerical Example 2)
Figure 5:
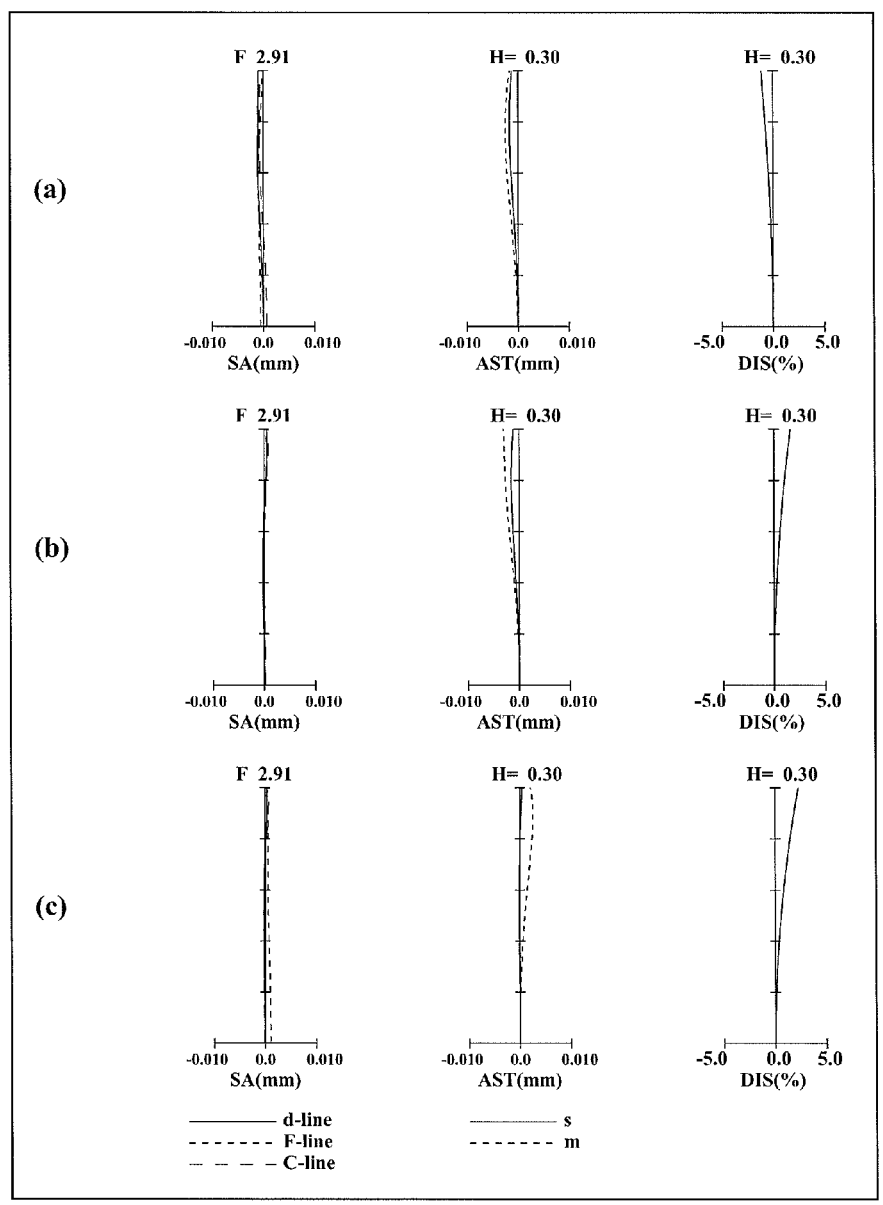
FIG. 5 is a longitudinal aberration diagram showing an infinity in-focus condition of the zoom lens system according to Numerical Example 2.
Figure 6:
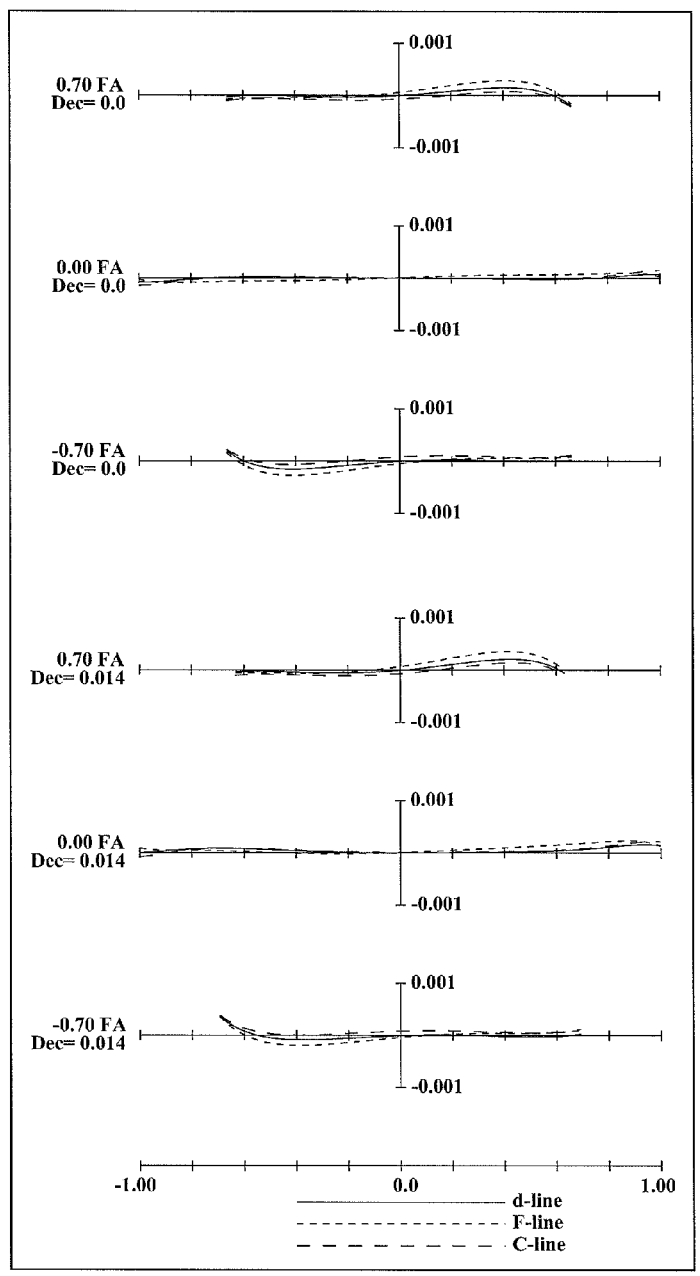
FIG. 6 is a lateral aberration diagram of the zoom lens system according to Numerical Example 2 at a telephoto limit in a basic state where image blur compensation is not performed and in an image blur compensation state.
Figure 7:
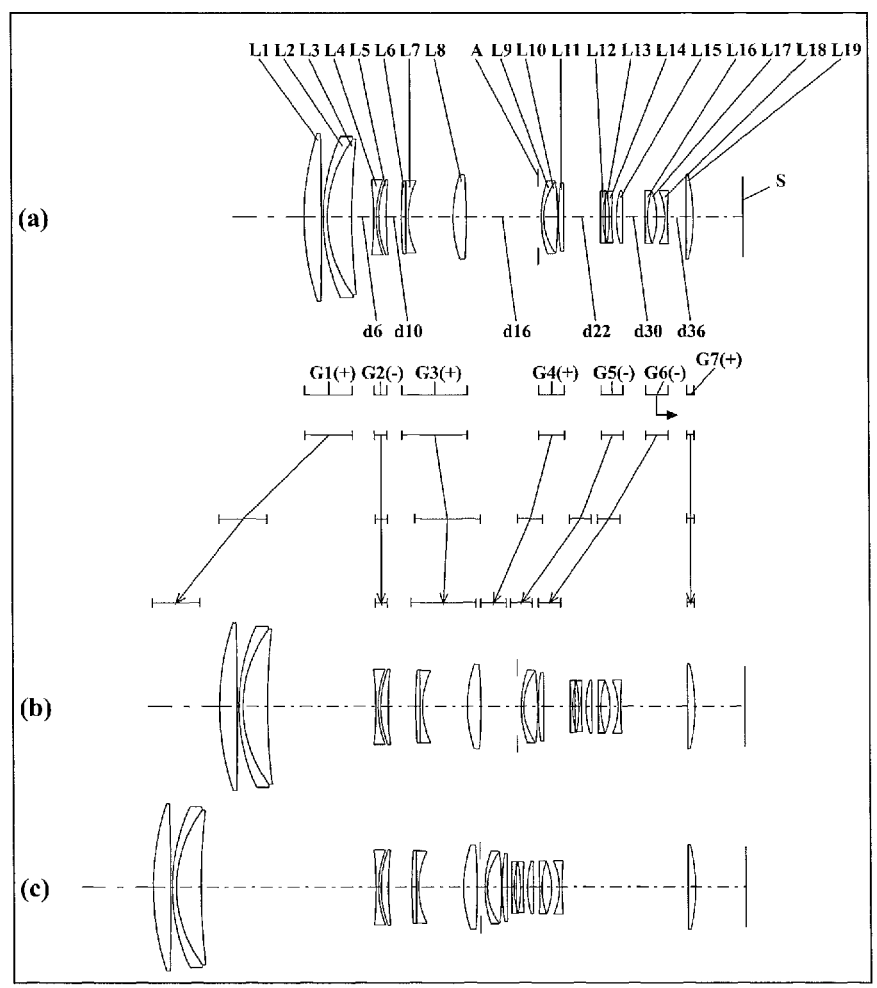
FIG. 7 is a lens arrangement diagram showing an infinity in-focus condition of a zoom lens system according to Embodiment 3 (Numerical Example 3)
Figure 8:
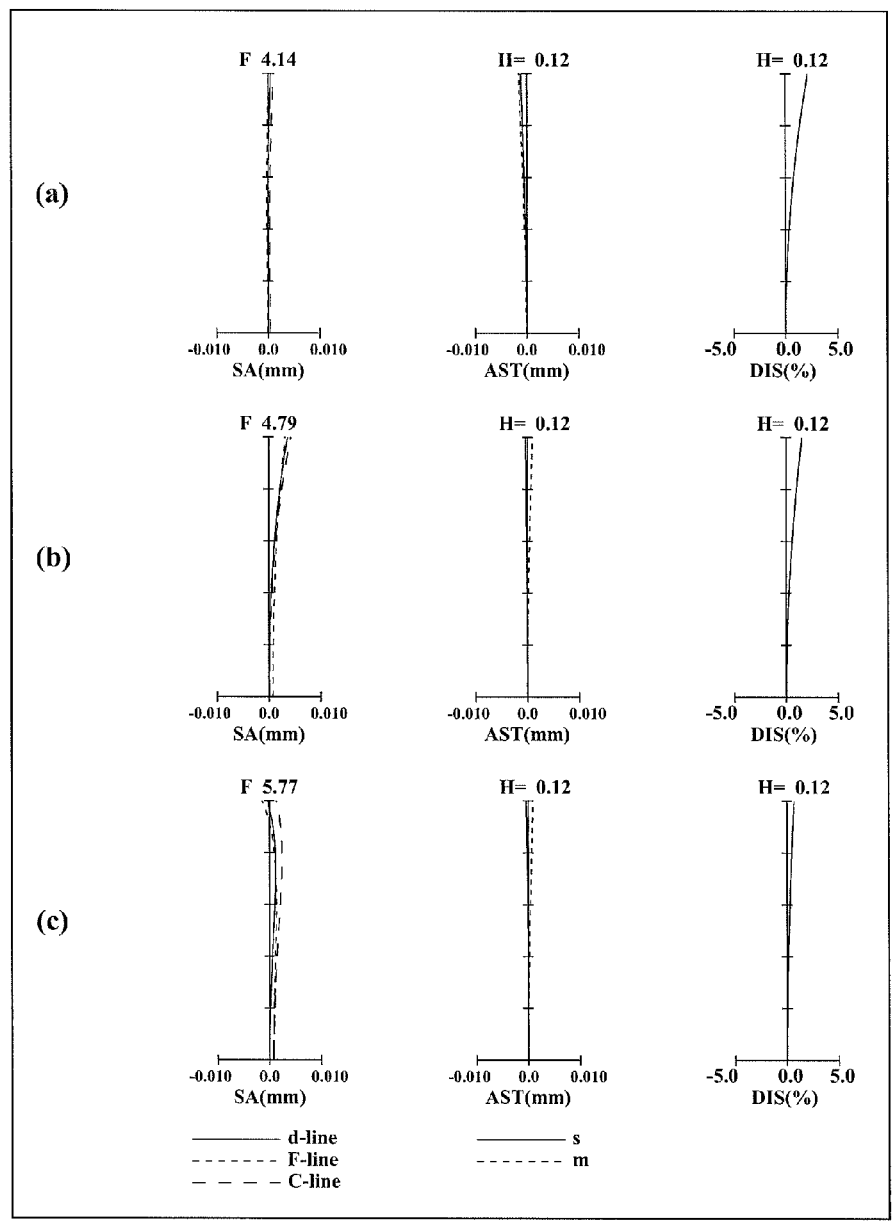
FIG. 8 is a longitudinal aberration diagram showing an infinity in-focus condition of the zoom lens system according to Numerical Example 3.
Figure 9:
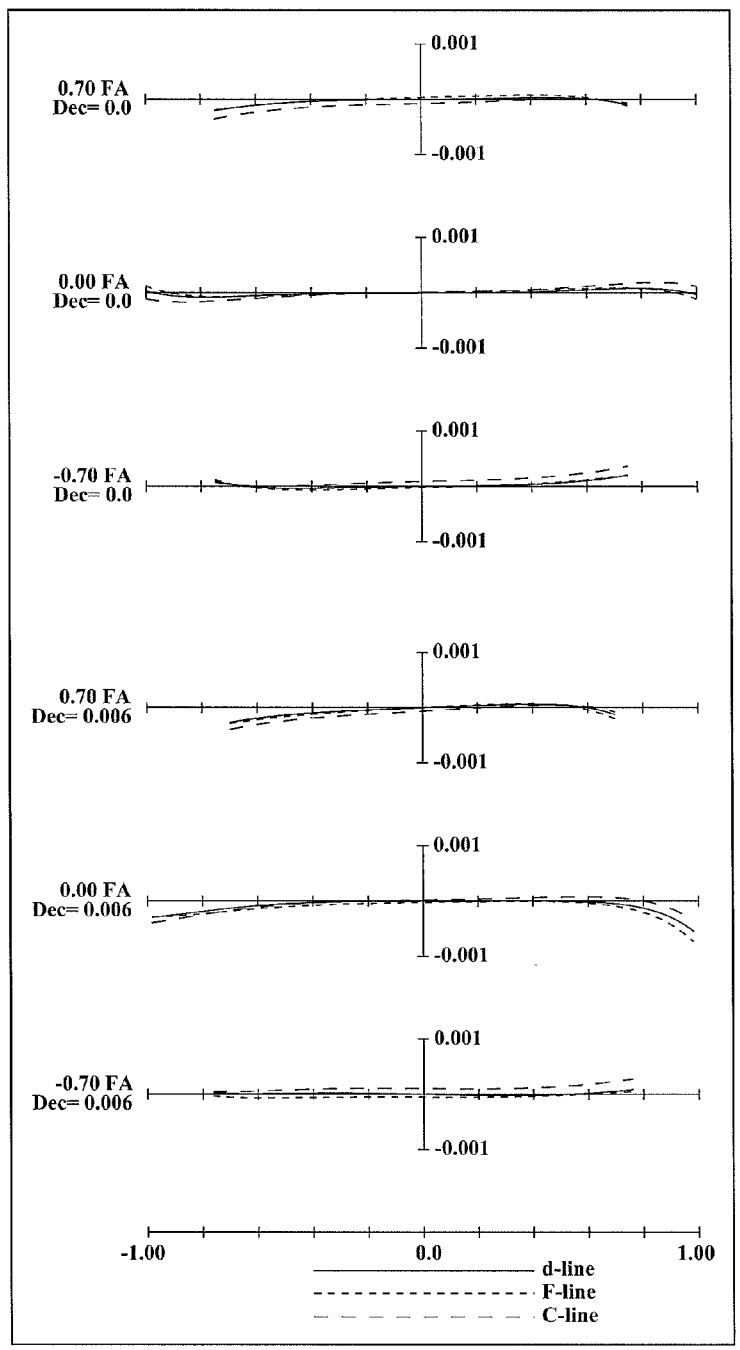
FIG. 9 is a lateral aberration diagram of the zoom lens system according to Numerical Example 3 at a telephoto limit in a basic state where image blur compensation is not performed and in an image blur compensation state.
Figure 13:
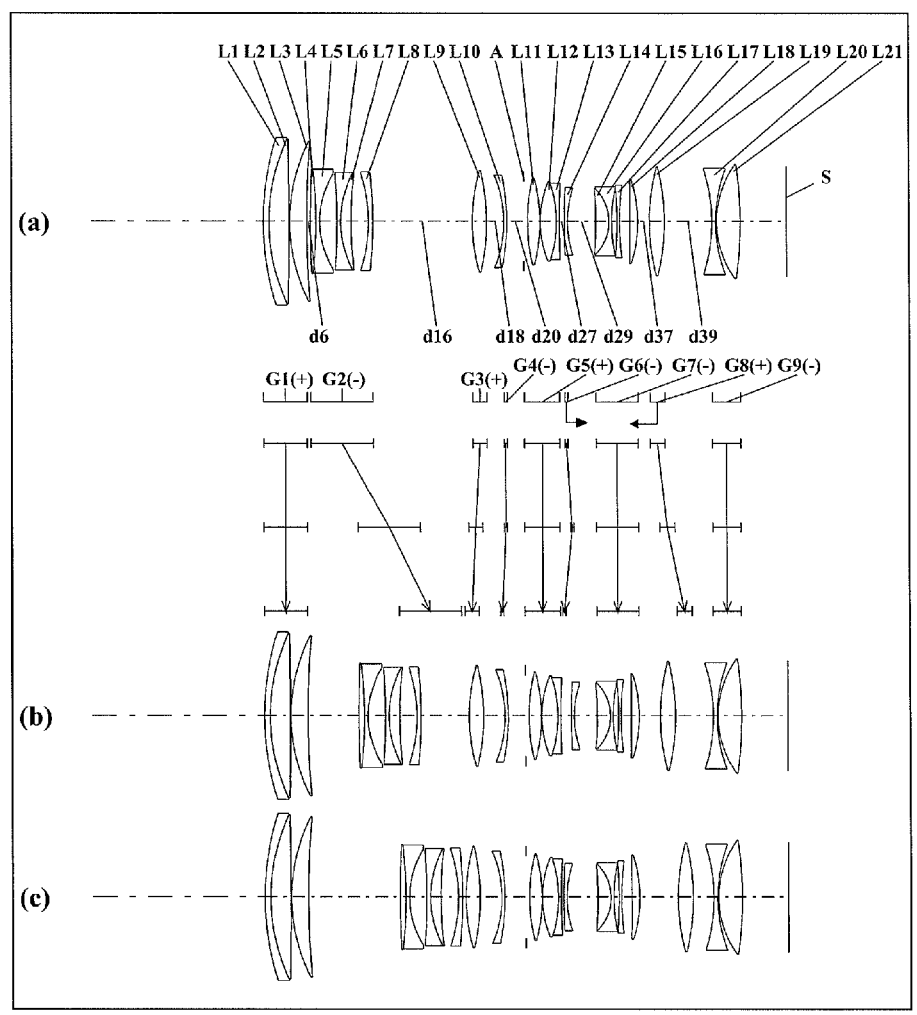
FIG. 13 is a lens arrangement diagram showing an infinity in-focus condition of a zoom lens system according to Embodiment 5 (Numerical Example 5)
Figure 14:
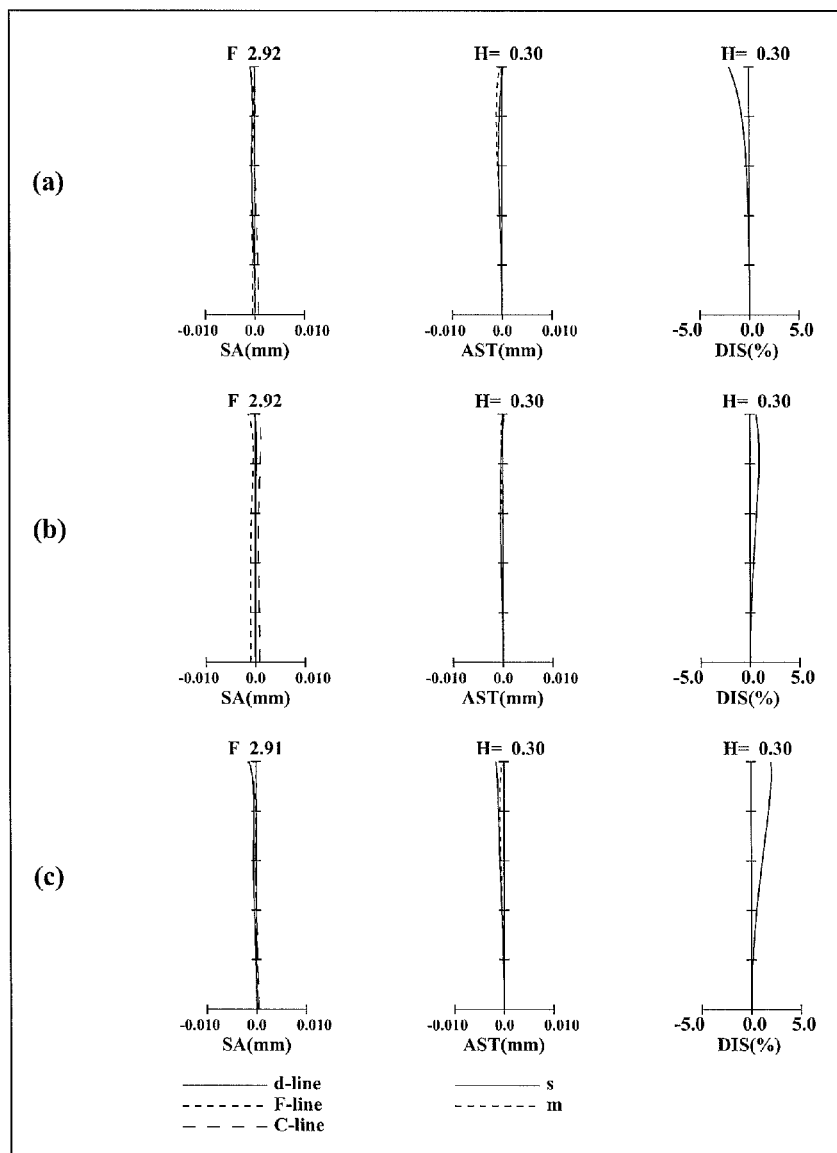
FIG. 14 is a longitudinal aberration diagram showing an infinity in-focus condition of the zoom lens system according to Numerical Example 5.
Figure 15:
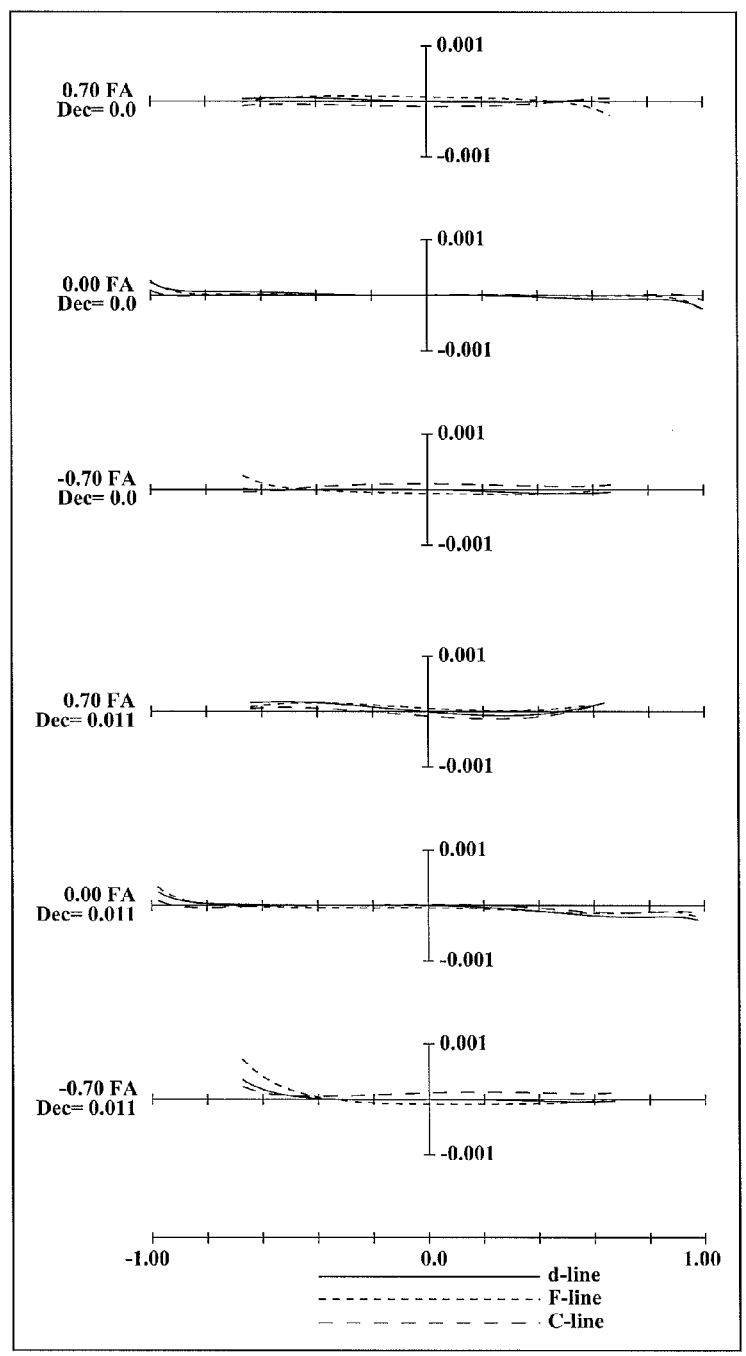
FIG. 15 is a lateral aberration diagram of the zoom lens system according to Numerical Example 5 at a telephoto limit in a basic state where image blur compensation is not performed and in an image blur compensation state.

Further, as shown in FIGS. 1, 10, 16 and 19, an aperture diaphragm A is provided within the third lens unit G3. As shown in FIG. 4, an aperture diaphragm A is provided closest to the image side in the second lens unit G2. As shown in FIG. 7, an aperture diaphragm A is provided closest to the object side in the fourth lens unit G4. As shown in FIG. 13, an aperture diaphragm A is provided closest to the object side in the fifth lens unit G5.

Embodiment 1

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; a negative meniscus fifth lens element L5 with the convex surface facing the object side; a positive meniscus sixth lens element L6 with the convex surface facing the object side; and a bi-concave seventh lens element L7. The fifth lens element L5 and the sixth lens element L6 are cemented with each other. In the surface data of the corresponding Numerical Example described later, a surface number 9 is imparted to an adhesive layer between the fifth lens element L5 and the sixth lens element L6.

The third lens unit G3, in order from the object side to the image side, comprises: a bi-convex eighth lens element L8; a negative meniscus ninth lens element L9 with the convex surface facing the object side; a positive meniscus tenth lens element L10 with the convex surface facing the object side; a bi-concave eleventh lens element L11; an aperture diaphragm A; a bi-concave twelfth lens element L12; and a bi-convex thirteenth lens element L13.

The fourth lens unit G4, in order from the object side to the image side, comprises: a negative meniscus fourteenth lens element L14 with the gentle convex surface facing the object side; a bi-convex fifteenth lens element L15; a bi-convex sixteenth lens element L16; a positive meniscus seventeenth lens element L17 with the convex surface facing the image side; and a bi-concave eighteenth lens element L18. The fourteenth lens element L14 and the fifteenth lens element L15 are cemented with each other. In the surface data of the corresponding Numerical Example described later, a surface number 28 is imparted to an adhesive layer between the fourteenth lens element L14 and the fifteenth lens element L15. The seventeenth lens element L17 and the eighteenth lens element L18 are cemented with each other.

The fifth lens unit G5 comprises solely a bi-convex nineteenth lens element L19.

The sixth lens unit G6, in order from the object side to the image side, comprises: a negative meniscus twentieth lens element L20 with the convex surface facing the object side; a bi-convex twenty-first lens element L21; and a bi-concave twenty-second lens element L22.

The seventh lens unit G7 comprises solely a positive meniscus twenty-third lens element L23 with the convex surface facing the object side.

In zooming from a wide-angle limit to a telephoto limit at the time of image taking, the respective lens units move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, the interval between the fourth lens unit G4 and the fifth lens unit G5 increases, the interval between the fifth lens unit G5 and the sixth lens unit G6 decreases, and the interval between the sixth lens unit G6 and the seventh lens unit G7 increases.

In zooming from the wide-angle limit to the telephoto limit at the time of image taking, the first lens unit G1 is fixed with respect to the image surface S, the second lens unit G2 moves to the image side, the third lens unit G3 is fixed with respect to the image surface S, the fourth lens unit G4 moves to the object side, the fifth lens unit G5 moves to the object side, the sixth lens unit G6 moves to the object side, and the seventh lens unit G7 is fixed with respect to the image surface S.

In focusing from an infinity in-focus condition to a close-object in-focus condition, the fifth lens unit G5 serving as a focusing lens unit moves to the object side along the optical axis in any zooming condition.

A cemented lens element composed of the seventeenth lens element L17 and the eighteenth lens element L18, which is a part of the fourth lens unit G4, corresponds to an image blur compensating lens unit that moves in a direction perpendicular to the optical axis to optically compensate image blur.

Embodiment 2

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and an aperture diaphragm A. The fifth lens element L5 and the sixth lens element L6 are cemented with each other.

The third lens unit G3, in order from the object side to the image side, comprises: a negative meniscus seventh lens element L7 with the convex surface facing the object side; a bi-convex eighth lens element L8; a bi-convex ninth lens element L9; a bi-concave tenth lens element L10; a bi-concave eleventh lens element L11; a bi-convex twelfth lens element L12; and a bi-convex thirteenth lens element L13. The seventh lens element L7 and the eighth lens element L8 are cemented with each other. In the surface data of the corresponding Numerical Example described later, a surface number 13 is imparted to an adhesive layer between the seventh lens element L7 and the eighth lens element L8. Further, the ninth lens element L9 and the tenth lens element L10 are cemented with each other. In the surface data of the corresponding Numerical Example described later, a surface number 17 is imparted to an adhesive layer between the ninth lens element L9 and the tenth lens element L10.

The fourth lens unit G4, in order from the object side to the image side, comprises: a bi-concave fourteenth lens element L14 with the gentle concave surface facing the object side; a bi-convex fifteenth lens element L15; a bi-convex sixteenth lens element L16; a positive meniscus seventeenth lens element L17 with the convex surface facing the image side; and a bi-concave eighteenth lens element L18. The fourteenth lens element L14 and the fifteenth lens element L15 are cemented with each other. In the surface data of the corresponding Numerical Example described later, a surface number 27 is imparted to an adhesive layer between the fourteenth lens element L14 and the fifteenth lens element L15. The seventeenth lens element L17 and the eighteenth lens element L18 are cemented with each other.

The fifth lens unit G5 comprises solely a positive meniscus nineteenth lens element L19 with the convex surface facing the object side.

The sixth lens unit G6, in order from the object side to the image side, comprises: a positive meniscus twentieth lens element L20 with the convex surface facing the image side; and a bi-concave twenty-first lens element L21.

The seventh lens unit G7 comprises solely a bi-convex twenty-second lens element L22.

In zooming from a wide-angle limit to a telephoto limit at the time of image taking, the respective lens units move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, the interval between the fourth lens unit G4 and the fifth lens unit G5 increases, the interval between the fifth lens unit G5 and the sixth lens unit G6 decreases, and the interval between the sixth lens unit G6 and the seventh lens unit G7 increases.

In zooming from the wide-angle limit to the telephoto limit at the time of image taking, the first lens unit G1 moves to the object side, the second lens unit G2 moves to the image side, the third lens unit G3 moves to the object side, the fourth lens unit G4 moves to the object side, the fifth lens unit G5 moves to the object side, the sixth lens unit G6 moves to the object side, and the seventh lens unit G7 is fixed with respect to the image surface S.

In focusing from an infinity in-focus condition to a close-object in-focus condition, the fifth lens unit G5 serving as a focusing lens unit moves to the object side along the optical axis in any zooming condition.

A cemented lens element composed of the seventeenth lens element L17 and the eighteenth lens element L18, which is a part of the fourth lens unit G4, corresponds to an image blur compensating lens unit that moves in a direction perpendicular to the optical axis to optically compensate image blur.

Embodiment 3

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other. In the surface data of the corresponding Numerical Example described later, a surface number 4 is imparted to an adhesive layer between the second lens element L2 and the third lens element L3.

The second lens unit G2, in order from the object side to the image side, comprises: a bi-concave fourth lens element L4; and a positive meniscus fifth lens element L5 with the convex surface facing the object side.

The third lens unit G3, in order from the object side to the image side, comprises: a bi-convex sixth lens element L6; a bi-concave seventh lens element L7; and a bi-convex eighth lens element L8. The sixth lens element L6 and the seventh lens element L7 are cemented with each other. In the surface data of the corresponding Numerical Example described later, a surface number 12 is imparted to an adhesive layer between the sixth lens element L6 and the seventh lens element L7.

The fourth lens unit G4, in order from the object side to the image side, comprises: an aperture diaphragm A; a negative meniscus ninth lens element L9 with the convex surface facing the object side; a bi-convex tenth lens element L10; and a bi-convex eleventh lens element L11. The ninth lens element L9 and the tenth lens element L10 are cemented with each other.

The fifth lens unit G5, in order from the object side to the image side, comprises: a negative meniscus twelfth lens element L12 with the convex surface facing the object side; a positive meniscus thirteenth lens element L13 with the convex surface facing the image side; a bi-concave fourteenth lens element L14; and a positive meniscus fifteenth lens element L15 with the convex surface facing the object side. The thirteenth lens element L13 and the fourteenth lens element L14 are cemented with each other. In the surface data of the corresponding Numerical Example described later, a surface number 26 is imparted to an adhesive layer between the thirteenth lens element L13 and the fourteenth lens element L14.

The sixth lens unit G6, in order from the object side to the image side, comprises: a bi-concave sixteenth lens element L16; a bi-convex seventeenth lens element L17; and a bi-concave eighteenth lens element L18. The sixteenth lens element L16 and the seventeenth lens element L17 are cemented with each other. In the surface data of the corresponding Numerical Example described later, a surface number 32 is imparted to an adhesive layer between the sixteenth lens element L16 and the seventeenth lens element L17.

The seventh lens unit G7 comprises solely a positive meniscus nineteenth lens element L19 with the convex surface facing the image side.

In zooming from a wide-angle limit to a telephoto limit at the time of image taking, the respective lens units move along the optical axis so that the interval between the first lens unit G1 and the second lens unit G2 increases, the interval between the second lens unit G2 and the third lens unit G3 increases, the interval between the third lens unit G3 and the fourth lens unit G4 decreases, the interval between the fourth lens unit G4 and the fifth lens unit G5 decreases, the interval between the fifth lens unit G5 and the sixth lens unit G6 decreases, and the interval between the sixth lens unit G6 and the seventh lens unit G7 increases.

In zooming from the wide-angle limit to the telephoto limit at the time of image taking, the first lens unit G1 moves to the object side, the second lens unit G2 is fixed with respect to the image surface S, the third lens unit G3 moves to the image side, the fourth lens unit G4 moves to the object side, the fifth lens unit G5 moves to the object side, the sixth lens unit G6 moves to the object side, and the seventh lens unit G7 is fixed with respect to the image surface S.

In focusing from an infinity in-focus condition to a close-object in-focus condition, the sixth lens unit G6 serving as a focusing lens unit moves to the image side along the optical axis in any zooming condition.

The twelfth lens element L12 and a cemented lens element composed of the thirteenth lens element L13 and the fourteenth lens element L14, which are part of the fifth lens unit G5, correspond to an image blur compensating lens unit that moves in a direction perpendicular to the optical axis to optically compensate image blur.

Embodiment 4

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; a positive meniscus fifth lens element L5 with the convex surface facing the object side; and a bi-concave sixth lens element L6. The fourth lens element L4 and the fifth lens element L5 are cemented with each other. In the surface data of the corresponding Numerical Example described later, a surface number 7 is imparted to an adhesive layer between the fourth lens element L4 and the fifth lens element L5.

The third lens unit G3, in order from the object side to the image side, comprises: a bi-convex seventh lens element L7; a bi-concave eighth lens element L8; an aperture diaphragm A; a negative meniscus ninth lens element L9 with the convex surface facing the image side; and a positive meniscus tenth lens element L10 with the convex surface facing the image side. The ninth lens element L9 and the tenth lens element L10 are cemented with each other. In the surface data of the corresponding Numerical Example described later, a surface number 18 is imparted to an adhesive layer between the ninth lens element L9 and the tenth lens element L10.

The fourth lens unit G4, in order from the object side to the image side, comprises: a negative meniscus eleventh lens element L11 with the convex surface facing the object side; a bi-convex twelfth lens element L12; a bi-convex thirteenth lens element L13; a positive meniscus fourteenth lens element L14 with the concave surface facing the image side; and a bi-concave fifteenth lens element L15. The eleventh lens element L11 and the twelfth lens element L12 are cemented with each other. In the surface data of the corresponding Numerical Example described later, a surface number 22 is imparted to an adhesive layer between the eleventh lens element L11 and the twelfth lens element L12. The fourteenth lens element L14 and the fifteenth lens element L15 are cemented with each other.

The fifth lens unit G5 comprises solely a positive meniscus sixteenth lens element L16 with the convex surface facing the object side.

The sixth lens unit G6, in order from the object side to the image side, comprises: a negative meniscus seventeenth lens element L17 with the convex surface facing the object side; a positive meniscus eighteenth lens element L18 with the convex surface facing the image side; and a bi-concave nineteenth lens element L19. The eighteenth lens element L18 and the nineteenth lens element L19 are cemented with each other. In the surface data of the corresponding Numerical Example described later, a surface number 35 is imparted to an adhesive layer between the eighteenth lens element L18 and the nineteenth lens element L19.

The seventh lens unit G7 comprises solely a bi-convex twentieth lens element L20.

In zooming from a wide-angle limit to a telephoto limit at the time of image taking, the respective lens units move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, the interval between the fourth lens unit G4 and the fifth lens unit G5 increases, the interval between the fifth lens unit G5 and the sixth lens unit G6 decreases, and the interval between the sixth lens unit G6 and the seventh lens unit G7 increases.

In zooming from the wide-angle limit to the telephoto limit at the time of image taking, the first lens unit G1 is fixed with respect to the image surface S, the second lens unit G2 moves to the image side, the third lens unit G3 is fixed with respect to the image surface S, the fourth lens unit G4 moves to the object side, the fifth lens unit G5 moves to the object side, the sixth lens unit G6 moves to the object side, and the seventh lens unit G7 is fixed with respect to the image surface S.

In focusing from an infinity in-focus condition to a close-object in-focus condition, the fifth lens unit G5 serving as a focusing lens unit moves to the object side along the optical axis in any zooming condition.

A cemented lens element composed of the fourteenth lens element L14 and the fifteenth lens element L15, which is a part of the fourth lens unit G4, corresponds to an image blur compensating lens unit that moves in a direction perpendicular to the optical axis to optically compensate image blur.

Embodiment 5

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a bi-convex fourth lens element L4; a bi-concave fifth lens element L5; a bi-concave sixth lens element L6; a positive meniscus seventh lens element L7 with the convex surface facing the object side; and a negative meniscus eighth lens element L8 with the convex surface facing the image side. The fourth lens element L4 and the fifth lens element L5 are cemented with each other. In the surface data of the corresponding Numerical Example described later, a surface number 8 is imparted to an adhesive layer between the fourth lens element L4 and the fifth lens element L5. Further, the sixth lens element L6 and the seventh lens element L7 are cemented with each other. In the surface data of the corresponding Numerical Example described later, a surface number 12 is imparted to an adhesive layer between the sixth lens element L6 and the seventh lens element L7.

The third lens unit G3 comprises solely a bi-convex ninth lens element L9.

The fourth lens unit G4 comprises solely a negative meniscus tenth lens element L10 with the convex surface facing the image side.

The fifth lens unit G5, in order from the object side to the image side, comprises: an aperture diaphragm A; a bi-convex eleventh lens element L11; a bi-convex twelfth lens element L12; and a bi-concave thirteenth lens element L13. The twelfth lens element L12 and the thirteenth lens element L13 are cemented with each other. In the surface data of the corresponding Numerical Example described later, a surface number 25 is imparted to an adhesive layer between the twelfth lens element L12 and the thirteenth lens element L13.

The sixth lens unit G6 comprises solely a negative meniscus fourteenth lens element L14 with the convex surface facing the object side.

The seventh lens unit G7, in order from the object side to the image side, comprises: a positive meniscus fifteenth lens element L15 with the convex surface facing the image side; a bi-concave sixteenth lens element L16; a bi-concave seventeenth lens element L17; and a positive meniscus eighteenth lens element L18 with the convex surface facing the image side. The fifteenth lens element L15 and the sixteenth lens element L16 are cemented with each other. In the surface data of the corresponding Numerical Example described later, a surface number 31 is imparted to an adhesive layer between the fifteenth lens element L15 and the sixteenth lens element L16.

The eighth lens unit G8 comprises solely a bi-convex nineteenth lens element L19.

The ninth lens unit G9, in order from the object side to the image side, comprises: a bi-concave twentieth lens element L20; and a bi-convex twenty-first lens element L21.

In zooming from a wide-angle limit to a telephoto limit at the time of image taking, the respective lens units move along the optical axis so that the interval between the first lens unit G1 and the second lens unit G2 increases, the interval between the second lens unit G2 and the third lens unit G3 decreases, the interval between the third lens unit G3 and the fourth lens unit G4 increases, the interval between the fourth lens unit G4 and the fifth lens unit G5 increases, the interval between the fifth lens unit G5 and the sixth lens unit G6 decreases, the interval between the sixth lens unit G6 and the seventh lens unit G7 increases, the interval between the seventh lens unit G7 and the eighth lens unit G8 increases, and the interval between the eighth lens unit G8 and the ninth lens unit G9 decreases.

In zooming from the wide-angle limit to the telephoto limit at the time of image taking, the first lens unit G1 is fixed with respect to the image surface S, the second lens unit G2 moves to the image side, the third lens unit G3 moves to the object side, the fourth lens unit G4 moves to the object side, the fifth lens unit G5 is fixed with respect to the image surface S, the sixth lens unit G6 moves to the object side, the seventh lens unit G7 is fixed with respect to the image surface S, the eighth lens unit G8 moves to the image side, and the ninth lens unit G9 is fixed with respect to the image surface S.

In focusing from an infinity in-focus condition to a close-object in-focus condition, the sixth lens unit G6 serving as a focusing lens unit moves to the image side along the optical axis in any zooming condition, and the eighth lens unit G8 serving as another focusing lens unit moves to the object side along the optical axis in any zooming condition.

A cemented lens element composed of the fifteenth lens element L15 and the sixteenth lens element L16, and the seventeenth lens element L17, which are part of the seventh lens unit G7, correspond to an image blur compensating lens unit that moves in a direction perpendicular to the optical axis to optically compensate image blur.

Embodiment 6

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other. In the surface data of the corresponding Numerical Example described later, a surface number 4 is imparted to an adhesive layer between the second lens element L2 and the third lens element L3.

The second lens unit G2, in order from the object side to the image side, comprises: a negative meniscus fourth lens element L4 with the convex surface facing the object side; a negative meniscus fifth lens element L5 with the convex surface facing the object side; a positive meniscus sixth lens element L6 with the convex surface facing the object side; and a negative meniscus seventh lens element L7 with the convex surface facing the image side. The fifth lens element L5 and the sixth lens element L6 are cemented with each other. In the surface data of the corresponding Numerical Example described later, a surface number 10 is imparted to an adhesive layer between the fifth lens element L5 and the sixth lens element L6.

The third lens unit G3, in order from the object side to the image side, comprises: a bi-convex eighth lens element L8; a positive meniscus ninth lens element L9 with the convex surface facing the object side; a negative meniscus tenth lens element L10 with the gentle convex surface facing the object side; an aperture diaphragm A; a negative meniscus eleventh lens element L11 with the convex surface facing the image side; and a positive meniscus twelfth lens element L12 with the convex surface facing the image side. The eleventh lens element L11 and the twelfth lens element L12 are cemented with each other. In the surface data of the corresponding Numerical Example described later, a surface number 23 is imparted to an adhesive layer between the eleventh lens element L11 and the twelfth lens element L12.

The fourth lens unit G4, in order from the object side to the image side, comprises: a negative meniscus thirteenth lens element L13 with the convex surface facing the object side; a bi-convex fourteenth lens element L14; a bi-convex fifteenth lens element L15; a positive meniscus sixteenth lens element L16 with the convex surface facing the image side; and a bi-concave seventeenth lens element L17. The thirteenth lens element L13 and the fourteenth lens element L14 are cemented with each other. In the surface data of the corresponding Numerical Example described later, a surface number 27 is imparted to an adhesive layer between the thirteenth lens element L13 and the fourteenth lens element L14. The sixteenth lens element L16 and the seventeenth lens element L17 are cemented with each other.

The fifth lens unit G5 comprises solely a positive meniscus eighteenth lens element L18 with the convex surface facing the object side.

The sixth lens unit G6, in order from the object side to the image side, comprises: a negative meniscus nineteenth lens element L19 with the convex surface facing the object side; a positive meniscus twentieth lens element L20 with the convex surface facing the image side; and a bi-concave twenty-first lens element L21.

The seventh lens unit G7 comprises solely a bi-convex twenty-second lens element L22.

In zooming from a wide-angle limit to a telephoto limit at the time of image taking, the respective lens units move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, the interval between the fourth lens unit G4 and the fifth lens unit G5 increases, the interval between the fifth lens unit G5 and the sixth lens unit G6 decreases, and the interval between the sixth lens unit G6 and the seventh lens unit G7 increases.

In zooming from the wide-angle limit to the telephoto limit at the time of image taking, the first lens unit G1 is fixed with respect to the image surface S, the second lens unit G2 moves to the image side, the third lens unit G3 is fixed with respect to the image surface S, the fourth lens unit G4 moves to the object side, the fifth lens unit G5 moves to the object side, the sixth lens unit G6 moves to the object side, and the seventh lens unit G7 is fixed with respect to the image surface S.

In focusing from an infinity in-focus condition to a close-object in-focus condition, the fifth lens unit G5 serving as a focusing lens unit moves to the object side along the optical axis in any zooming condition.

A cemented lens element composed of the sixteenth lens element L16 and the seventeenth lens element L17, which is a part of the fourth lens unit G4, corresponds to an image blur compensating lens unit that moves in a direction perpendicular to the optical axis to optically compensate image blur.

Embodiment 7

The first lens unit G1, in order from the object side to the image side, comprises: a negative meniscus first lens element L1 with the convex surface facing the object side, a bi-convex second lens element L2; a negative meniscus third lens element L3 with the convex surface facing the object side; and a positive meniscus fourth lens element L4 with the convex surface facing the object side. The first lens element L1 and the second lens element L2 are cemented with each other. In the surface data of the corresponding Numerical Example described later, a surface number 2 is imparted to an adhesive layer between the first lens element L1 and the second lens element L2. Further, the third lens element L3 and the fourth lens element L4 are cemented with each other. In the surface data of the corresponding Numerical Example described later, a surface number 6 is imparted to an adhesive layer between the third lens element L3 and the fourth lens element L4.

The second lens unit G2, in order from the object side to the image side, comprises: a negative meniscus fifth lens element L5 with the convex surface facing the object side; a positive meniscus sixth lens element L6 with the convex surface facing the object side; and a bi-concave seventh lens element L7. The fifth lens element L5 and the sixth lens element L6 are cemented with each other. In the surface data of the corresponding Numerical Example described later, a surface number 10 is imparted to an adhesive layer between the fifth lens element L5 and the sixth lens element L6.

The third lens unit G3, in order from the object side to the image side, comprises: a bi-convex eighth lens element L8; a positive meniscus ninth lens element L9 with the convex surface facing the object side; a negative meniscus tenth lens element L10 with the gentle convex surface facing the object side; an aperture diaphragm A; and a negative meniscus eleventh lens element L11 with the convex surface facing the image side.

The fourth lens unit G4, in order from the object side to the image side, comprises: a negative meniscus twelfth lens element L12 with the convex surface facing the object side; a bi-convex thirteenth lens element L13; a bi-convex fourteenth lens element L14; a positive meniscus fifteenth lens element L15 with the convex surface facing the image side; and a bi-concave sixteenth lens element L16. The twelfth lens element L12 and the thirteenth lens element L13 are cemented with each other. In the surface data of the corresponding Numerical Example described later, a surface number 25 is imparted to an adhesive layer between the twelfth lens element L12 and the thirteenth lens element L13. Further, the fifteenth lens element L15 and the sixteenth lens element L16 are cemented with each other. In the surface data of the corresponding Numerical Example described later, a surface number 31 is imparted to an adhesive layer between the fifteenth lens element L15 and the sixteenth lens element L16.

The fifth lens unit G5 comprises solely a positive meniscus seventeenth lens element L17 with the convex surface facing the object side.

The sixth lens unit G6, in order from the object side to the image side, comprises: a negative meniscus eighteenth lens element L18 with the convex surface facing the object side; a bi-convex nineteenth lens element L19; and a bi-concave twentieth lens element L20.

The seventh lens unit G7 comprises solely a positive meniscus twenty-first lens element L21 with the convex surface facing the object side.

In zooming from a wide-angle limit to a telephoto limit at the time of image taking, the respective lens units move along the optical axis so that the interval between the first lens unit G1 and the second lens unit G2 increases, the interval between the second lens unit G2 and the third lens unit G3 decreases, the interval between the third lens unit G3 and the fourth lens unit G4 decreases, the interval between the fourth lens unit G4 and the fifth lens unit G5 increases, the interval between the fifth lens unit G5 and the sixth lens unit G6 decreases, and the interval between the sixth lens unit G6 and the seventh lens unit G7 increases.

In zooming from the wide-angle limit to the telephoto limit at the time of image taking, the first lens unit G1 is fixed with respect to the image surface S, the second lens unit G2 moves to the image side, the third lens unit G3 is fixed with respect to the image surface S, the fourth lens unit G4 moves to the object side, the fifth lens unit G5 moves to the object side, the sixth lens unit G6 moves to the object side, and the seventh lens unit G7 is fixed with respect to the image surface S.

In focusing from an infinity in-focus condition to a close-object in-focus condition, the fifth lens unit G5 serving as a focusing lens unit moves to the object side along the optical axis in any zooming condition.

A cemented lens element composed of the fifteenth lens element L15 and the sixteenth lens element L16, which is a part of the fourth lens unit G4, corresponds to an image blur compensating lens unit that moves in a direction perpendicular to the optical axis to optically compensate image blur.

The zoom lens systems according to Embodiments 1 to 7, in order from the object side to the image side, each comprise: the first lens unit G1 having positive optical power; the second lens unit G2 having negative optical power; and the subsequent lens units. The first lens unit G1 is composed of three or four lens elements.

Since the first lens unit G1 is composed of three or four lens elements, spherical aberration at a telephoto limit and magnification chromatic aberration at a wide-angle limit can be simultaneously and successfully compensated. In the zoom lens systems according to Embodiments 1 to 7, since the first lens unit G1 includes one or more lens elements having negative optical power, the above effect can be achieved more successfully. When the first lens unit G1 is composed of five or more lens elements, the overall length of lens system is likely to be increased. Further, since the first lens unit G1 having positive optical power has a large effective diameter, when the first lens unit G1 is composed of five or more lens elements, the cost is increased, which is not beneficial.

The zoom lens systems according to Embodiments 1 to 7 each are provided with: the aperture diaphragm A; the image blur compensating lens unit composed of one or more lens elements, which moves in a direction perpendicular to the optical axis to optically compensate image blur; and the focusing lens unit composed of one or more lens elements, which moves along the optical axis in focusing from an infinity in-focus condition to a close-object in-focus condition. The subsequent lens units include the aperture diaphragm A, the image blur compensating lens unit, and the focusing lens unit. The image blur compensating lens unit and the focusing lens unit are provided on the image side relative to the aperture diaphragm A.

In the lens configuration including the first lens unit G1 having positive optical power, the second lens unit G2 having negative optical power, and the subsequent lens units, the luminous flux diameter tends to be smaller on the image side of the aperture diaphragm A than on the object side thereof. Therefore, when diameter reduction and weight reduction of the image blur compensating lens unit and the focusing lens unit are supposed, it is most desirable to provide the image blur compensating lens unit and the focusing lens unit on the image side relative to the aperture diaphragm A. Further, when diameter reduction and weight reduction of the image blur compensating lens unit and the focusing lens unit are achieved, simplification and size reduction of a drive system are also achieved, thereby realizing size reduction and weight reduction of a lens barrel holding the zoom lens system.

In the zoom lens systems according to Embodiments 1 to 7, no lens element having negative optical power is provided between the image blur compensating lens unit and the focusing lens unit. If a lens element having negative optical power is provided between the image blur compensating lens unit and the focusing lens unit, diverging light might be incident on a lens element provided on the image side relative to the lens element having negative optical power. Then, in order to secure a sufficient amount of light while taking into account the incident diverging light, the lens diameter has to be increased. As a result, it becomes difficult to simplify and downsize the drive system for controlling focusing and blur compensation, which makes it difficult to achieve size reduction and weight reduction of the lens barrel.

In the zoom lens systems according to Embodiments 1 to 4, 6 and 7, the lens unit provided closest to the image side has positive optical power. Therefore, the angle of light beam incident on the image surface S becomes gentle. In addition, a displacement of an angular width of the light beam incident on the image surface S, which displacement occurs in zooming from a wide-angle limit to a telephoto limit at the time of image taking, can be reduced, and thus an image having uniform brightness even in a peripheral portion of a screen can be obtained.

In the zoom lens systems according to Embodiments 1 to 7, the lens unit provided closest to the image side is fixed with respect to the image surface S in zooming from a wide-angle limit to a telephoto limit at the time of image taking Therefore, the configuration of the lens barrel can be simplified.

In the zoom lens systems according to Embodiments 1 to 7, at least one of the image blur compensating lens unit and the focusing lens unit has negative optical power. Therefore, at least one of the image blur compensating lens unit and the focusing lens unit can be provided at a position where the light beam is narrowed, on the image side relative to the aperture diaphragm A, which is advantageous for size reduction and weight reduction of the zoom lens system.

In the zoom lens systems according to Embodiments 1 to 7, the subsequent lens units include at least three lens units. By providing, as the subsequent lens units, three or more lens units, the intervals between which vary in zooming from a wide-angle limit to a telephoto limit at the time of image taking, it is possible to successfully maintain optical performance of the zoom lens system over the entire zooming area, which contributes to size reduction and weight reduction of the optical system.

In the zoom lens systems according to Embodiments 1 to 7, the image blur compensating lens unit includes a cemented lens element. When the image blur compensating lens unit is moved in a direction perpendicular to the optical axis, a color shift occurs, which might cause a reduction in optical performance. However, since the image blur compensating lens unit includes a cemented lens element obtained by cementing a lens element having positive optical power and a lens element having negative optical power with each other, such a color shift can be successfully compensated at the time of image blur compensation.

In the zoom lens systems according to Embodiments 1 and 4 to 7, the first lens unit G1 is fixed with respect to the image surface S in zooming from a wide-angle limit to a telephoto limit at the time of image taking Therefore, the center of gravity of the lens barrel is maintained constant over the entire zooming area, thereby realizing stable image taking Further, the configuration of the lens barrel can be simplified, and dust-proofness and drip-proofness of the lens barrel are enhanced.

In the zoom lens systems according to Embodiments 1 and 4 to 7, the subsequent lens units include at least two lens units, and the first lens unit G1 and the at least two lens units as the subsequent lens units are fixed with respect to the image surface S in zooming from a wide-angle limit to a telephoto limit at the time of image taking That is, the zoom lens systems according to Embodiments 1 and 4 to 7 each include three or more lens units that do not move along the optical axis in zooming. Thus, by reducing the number of the movable lens units, the configuration of the lens barrel can be simplified, thereby realizing cost reduction of an interchangeable lens apparatus and a camera system.

In the zoom lens systems according to Embodiments 1 and 4 to 7, the aperture diaphragm A is fixed with respect to the image surface S in zooming from a wide-angle limit to a telephoto limit at the time of image taking Generally, a drive system unit constituting an aperture diaphragm tends to be increased in size. Therefore, by simplifying the configuration of a lens barrel in the vicinity of the aperture diaphragm, a space for installation of the drive system unit constituting the aperture diaphragm is secured, thereby achieving size reduction of the diameter of the lens barrel.

In the zoom lens systems according to Embodiments 1 and 4 to 7, the most object side lens surface of the focusing lens unit has a convex shape protruding toward the object side. Therefore, variation in spherical aberration can be sufficiently suppressed in focusing from an infinity in-focus condition to a close-object in-focus condition.

In the zoom lens systems according to Embodiments 1, 4, 6 and 7, the aperture diaphragm, the image blur compensating lens unit, and the focusing lens unit are provided in order from the object side to the image side. Therefore, it is possible to realize size reduction and weight reduction of the image blur compensating lens unit and the focusing lens unit.

As described above, Embodiments 1 to 7 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 7 can satisfy. Here, a plurality of beneficial conditions is set forth for the zoom lens system according to each embodiment. A construction that satisfies all the plurality of conditions is most effective for the zoom lens system. However, when an individual condition is satisfied, a zoom lens system having the corresponding effect is obtained.

For example, in a zoom lens system like the zoom lens systems according to Embodiments 1 to 7, which comprises, in order from the object side to the image side, a first lens unit having positive optical power, a second lens unit having negative optical power, and subsequent lens units, wherein the first lens unit is composed of three or four lens elements, the zoom lens system being provided with: an aperture diaphragm; an image blur compensating lens unit composed of one or more lens elements, which moves in a direction perpendicular to the optical axis to optically compensate image blur; and a focusing lens unit composed of one or more lens elements, which moves along the optical axis in focusing from an infinity in-focus condition to a close-object in-focus condition, wherein the subsequent lens units include the aperture diaphragm, the image blur compensating lens unit, and the focusing lens unit, and the image blur compensating lens unit and the focusing lens unit are provided on the image side relative to the aperture diaphragm (this lens configuration is referred to as a basic configuration of the embodiments, hereinafter), the following conditions (1) and (2) are satisfied:

$$1.8<|(Y_W/f_W) \times F_{NOT} \times (f_T/f_W)|<4.5 \quad (1)$$

$$0.001<(D_{1W}+D_{2T})/f_W<0.200 \quad (2)$$

where $Y_W$ is a diagonal image height at a wide-angle limit, which is expressed by the following equation:

$Y_W = f_W \times \tan(\omega_W)$, $f_W$ is a focal length of the zoom lens system at the wide-angle limit, $f_T$ is a focal length of the zoom lens system at a telephoto limit, $\omega_W$ is a half view angle at the wide-angle limit, $F_{NOT}$ is F-number at the telephoto limit, $D_{1W}$ is an inter-apex distance between the first lens unit and the second lens unit at the wide-angle limit, and $D_{2T}$ is an inter-apex distance between the second lens unit and a lens unit provided closest to the object side among the subsequent lens units at the telephoto limit.

The condition (1) sets forth the relationship between a zooming variation range from the wide-angle limit to the telephoto limit, that is, a zoom ratio, and the diagonal image height at the wide-angle limit and the F-number at the telephoto limit. Since the zoom lens systems according to the respective embodiments satisfy the condition (1), it is possible to achieve reduction in the overall length of lens system and increase in the diameter at the telephoto limit while maintaining excellent optical performance over the entire zooming area. When the value exceeds the upper limit of the condition (1), the effective diameter of the lens element provided on the image side relative to the aperture diaphragm is increased, and size reduction and weight reduction of the image blur compensating lens unit and the focusing lens unit cannot be achieved. When the value goes below the lower limit of the condition (1), high optical performance cannot be maintained with reduction in the overall length of lens system.

When at least one of the following conditions (1)' and (1)'' is further satisfied, the above-mentioned effect is achieved more successfully.

$$2.1<|(Y_W/f_W) \times F_{NOT} \times (f_T/f_W)| \quad (1)'$$

$$|(Y_W/f_W) \times F_{NOT} \times (f_T/f_W)|<4.4 \quad (1)''$$

The condition (2) sets forth the ratio between the sum of the interval between the first lens unit and the second lens unit at the wide-angle limit and the interval between the second lens unit and the lens unit provided closest to the object side among the subsequent lens units, that is, the third lens unit at the telephoto limit, and the focal length at the wide-angle limit. Since the zoom lens systems according to the respective embodiments satisfy the condition (2), the overall length of each zoom lens system is minimized. When the value exceeds the upper limit of the condition (2), possibility of reduction in the overall length of lens system still remains at the wide-angle limit, and therefore, it is not optimal in terms of size reduction. When the value goes below the lower limit of the condition (2), the interval between the first lens unit and the second lens unit is not sufficiently secured at the wide-angle limit or the interval between the second lens unit and the third lens unit is not sufficiently secured at the telephoto limit, which causes the configuration of the lens barrel to be unpractical.

When at least one of the following conditions (2-1)' and (2-1)'' is further satisfied, the above-mentioned effect is achieved more successfully.

$$0.001<(D_{1W}+D_{2T})/f_W \quad (2-1)'$$

$$(D_{1W}+D_{2T})/f_W<0.18 \quad (2-1)''$$

When at least one of the following conditions (2-2)' and (2-2)'' is further satisfied, the above-mentioned effect is achieved more successfully.

$$0.002<(D_{1W}+D_{2T})/f_W \quad (2-2)'$$

$$(D_{1W}+D_{2T})/f_W<0.16 \quad (2)''$$

The individual lens units constituting the zoom lens systems according to Embodiments 1 to 7 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 8

Figure 22:
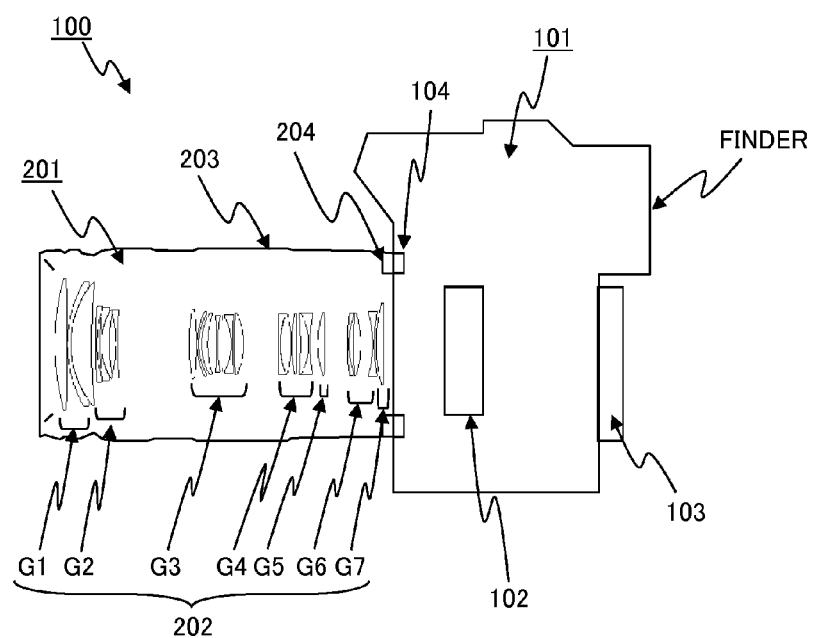
FIG. 22 is a schematic construction diagram of an interchangeable-lens type digital camera system according to Embodiment 8.

FIG. 22 is a schematic construction diagram of an interchangeable-lens type digital camera system according to Embodiment 8.

The interchangeable-lens type digital camera system 100 according to Embodiment 8 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 7; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 22, the zoom lens system according to Embodiment 1 is employed as the zoom lens system 202.

In Embodiment 8, since the zoom lens system 202 according to any of Embodiments 1 to 7 is employed, a compact interchangeable lens apparatus having excellent imaging performance can be realized at low cost. Moreover, size reduction and cost reduction of the entire camera system 100 according to Embodiment 8 can be achieved. In the zoom lens systems according to Embodiments 1 to 7, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 7.

As described above, Embodiment 8 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 7 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line.

FIGS. 2, 5, 8, 11, 14, 17, and 20 are longitudinal aberration diagrams of an infinity in-focus condition of the zoom lens systems according to Numerical Examples 1 to 7, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, 18, and 21 are lateral aberration diagrams of the zoom lens systems according to Numerical Examples 1 to 7 at a telephoto limit, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1.

In the zoom lens system according to each Numerical Example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.014 |
| 2 | 0.014 |
| 3 | 0.006 |
| 4 | 0.015 |
| 5 | 0.011 |
| 6 | 0.014 |
| 7 | 0.014 |

When the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the various data. Table 3 shows the single lens data. Table 4 shows the zoom lens unit data. Table 5 shows the magnification of zoom lens unit.

TABLE 1

(Surface data)

| Surface number | r | d | nd | vd |
|---|---|---|---|---|
| Object surface | ∞ | | | |
| 1 | 1.97670 | 0.09710 | 1.59349 | 67.0 |
| 2 | −27.34500 | 0.00280 | | |
| 3 | 0.99050 | 0.02770 | 1.90366 | 31.3 |
| 4 | 0.76780 | 0.16640 | 1.43700 | 95.1 |
| 5 | 6.20320 | Variable | | |
| 6 | 3.73750 | 0.01110 | 1.80610 | 40.7 |
| 7 | 0.88470 | 0.02420 | | |
| 8 | 2.01260 | 0.01110 | 1.90366 | 31.3 |
| 9 | 0.52090 | 0.00010 | 1.56732 | 42.8 |
| 10 | 0.52090 | 0.06490 | 1.94595 | 18.0 |
| 11 | 1.31660 | 0.05180 | | |
| 12 | −1.14410 | 0.01660 | 1.62041 | 60.3 |
| 13 | 8.49400 | Variable | | |
| 14 | 1.46840 | 0.06100 | 2.00100 | 29.1 |
| 15 | −2.13270 | 0.00280 | | |
| 16 | 0.56500 | 0.01140 | 1.85000 | 32.4 |
| 17 | 0.45250 | 0.02570 | | |
| 18 | 0.50010 | 0.04820 | 1.90366 | 31.3 |
| 19 | 0.76250 | 0.06830 | | |
| 20 | −9.80030 | 0.01110 | 1.94595 | 18.0 |
| 21 | 1.15290 | 0.03530 | | |
| 22(Diaphragm) | ∞ | 0.07310 | | |
| 23 | −0.45230 | 0.01110 | 1.80518 | 25.5 |
| 24 | 3.15330 | 0.01150 | | |
| 25 | 2.43770 | 0.07790 | 1.80610 | 33.3 |
| 26 | −0.57980 | Variable | | |
| 27 | 6.00420 | 0.01390 | 1.99585 | 27.9 |
| 28 | 0.65510 | 0.00010 | 1.56732 | 42.8 |
| 29 | 0.65510 | 0.08810 | 1.59349 | 67.0 |
| 30 | −0.91840 | 0.00280 | | |
| 31 | 1.23050 | 0.04170 | 2.00100 | 29.1 |
| 32 | −34.22880 | 0.02930 | | |
| 33 | −2.87640 | 0.06410 | 1.88527 | 19.1 |
| 34 | −0.52510 | 0.01110 | 1.83320 | 27.2 |
| 35 | 1.27270 | Variable | | |
| 36 | 0.75850 | 0.05550 | 1.68051 | 49.4 |
| 37 | −11.63970 | Variable | | |
| 38 | 1.87400 | 0.01110 | 1.89021 | 26.0 |
| 39 | 0.66790 | 0.04010 | | |
| 40 | 11.52330 | 0.05520 | 1.64914 | 55.2 |
| 41 | −0.88320 | 0.09760 | | |
| 42 | −0.83910 | 0.01110 | 1.59042 | 41.9 |
| 43 | 1.31070 | Variable | | |
| 44 | 1.19230 | 0.05990 | 1.94276 | 18.0 |
| 45 | 174.07690 | (BF) | | |
| Image surface | ∞ | | | |

TABLE 2

(Various data)
Zooming ratio 2.69978

| | Wide-angle limit | Middle position | Telephoto limit |
|---|---|---|---|
| Focal length | 0.9999 | 1.6429 | 2.6995 |
| F-number | 2.90336 | 2.93270 | 2.90504 |
| Half view angle | 16.8769 | 10.2190 | 6.2154 |
| Image height | 0.3000 | 0.3000 | 0.3000 |
| Overall length of lens system | 3.2248 | 3.2235 | 3.2244 |
| BF | 0.60383 | 0.60370 | 0.60439 |
| d5 | 0.0290 | 0.3162 | 0.5812 |
| d13 | 0.5667 | 0.2796 | 0.0146 |
| d26 | 0.2769 | 0.1631 | 0.0142 |
| d35 | 0.0610 | 0.0736 | 0.2223 |
| d37 | 0.1808 | 0.1683 | 0.0196 |
| d43 | 0.0138 | 0.1262 | 0.2753 |
| Entrance pupil position | 1.0843 | 1.8262 | 2.7418 |
| Exit pupil position | −1.3670 | −1.5729 | −2.3271 |
| Front principal points position | 1.5769 | 2.2291 | 2.9554 |
| Back principal points position | 2.2249 | 1.5806 | 0.5249 |

TABLE 3

(Single lens data)

| Lens element | Initial surface number | Focal length |
|---|---|---|
| 1 | 1 | 3.1099 |
| 2 | 3 | −4.0161 |
| 3 | 4 | 1.9867 |
| 4 | 6 | −1.4404 |
| 5 | 8 | −0.7805 |
| 6 | 10 | 0.8764 |
| 7 | 12 | −1.6241 |
| 8 | 14 | 0.8762 |
| 9 | 16 | −2.8042 |
| 10 | 18 | 1.4792 |
| 11 | 20 | −1.0900 |
| 12 | 23 | −0.4906 |
| 13 | 25 | 0.5878 |
| 14 | 27 | −0.7394 |
| 15 | 29 | 0.6580 |
| 16 | 31 | 1.1873 |
| 17 | 33 | 0.7164 |
| 18 | 34 | −0.4449 |
| 19 | 36 | 1.0483 |
| 20 | 38 | −1.1708 |
| 21 | 40 | 1.2659 |
| 22 | 42 | −0.8648 |
| 23 | 44 | 1.2732 |

TABLE 4

(Zoom lens unit data)

| Lens unit | Initial surface No. | Focal length | Overall length of lens unit | Front principal points position | Back principal points position |
|---|---|---|---|---|---|
| 1 | 1 | 1.75963 | 0.29400 | −0.00193 | 0.10051 |
| 2 | 6 | −0.64586 | 0.17980 | 0.07440 | 0.12594 |
| 3 | 14 | 1.70594 | 0.43740 | −0.14685 | −0.05234 |
| 4 | 27 | 3.90066 | 0.25110 | −0.09937 | 0.00938 |
| 5 | 36 | 1.04831 | 0.05550 | 0.00202 | 0.02444 |
| 6 | 38 | −0.80391 | 0.21510 | 0.11953 | 0.16267 |
| 7 | 44 | 1.27320 | 0.05990 | −0.00021 | 0.02886 |

TABLE 5

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | −0.79064 | −1.21935 | −2.44020 |
| 3 | 14 | 22.52504 | 19.84697 | −3.89895 |
| 4 | 27 | −0.11648 | −0.13542 | 0.32907 |
| 5 | 36 | 0.20561 | 0.20317 | 0.32767 |
| 6 | 38 | 2.65730 | 2.79650 | 2.98534 |
| 7 | 44 | 0.50136 | 0.50146 | 0.50092 |

Numerical Example 2

The zoom lens system of Numerical Example 2 corresponds to Embodiment 2 shown in FIG. 4. Table 6 shows the surface data of the zoom lens system of Numerical Example 2. Table 7 shows the various data. Table 8 shows the single lens data. Table 9 shows the zoom lens unit data. Table 10 shows the magnification of zoom lens unit.

TABLE 6

(Surface data)

| Surface number | r | d | nd | vd |
|---|---|---|---|---|
| Object surface | ∞ | | | |
| 1 | 1.88670 | 0.02770 | 1.90366 | 31.3 |
| 2 | 1.47620 | 0.11830 | 1.49700 | 81.6 |
| 3 | −24.47620 | 0.00280 | | |
| 4 | 1.88940 | 0.06900 | 1.49700 | 81.6 |
| 5 | 5.94170 | Variable | | |
| 6 | 1.30460 | 0.01120 | 1.59669 | 65.5 |
| 7 | 0.50010 | 0.08610 | | |
| 8 | −0.72310 | 0.01160 | 1.64013 | 32.6 |
| 9 | 0.62800 | 0.05760 | 1.94595 | 18.0 |
| 10 | 2.65740 | 0.04160 | | |
| 11(Diaphragm) | ∞ | Variable | | |
| 12 | 1.38340 | 0.01110 | 1.98339 | 24.5 |
| 13 | 0.50340 | 0.00010 | 1.56732 | 42.8 |
| 14 | 0.50340 | 0.11000 | 1.82918 | 35.6 |
| 15 | −1.25640 | 0.00550 | | |
| 16 | 0.47400 | 0.10440 | 1.78164 | 26.2 |
| 17 | −1.47790 | 0.00010 | 1.56732 | 42.8 |
| 18 | −1.47790 | 0.04250 | 1.81011 | 24.2 |
| 19 | 0.42220 | 0.09800 | | |
| 20 | −0.42850 | 0.01110 | 1.84566 | 23.8 |
| 21 | 66.88480 | 0.01340 | | |
| 22 | 1.65520 | 0.04120 | 1.76565 | 22.3 |
| 23 | −11.25210 | 0.00480 | | |
| 24 | 31.51010 | 0.06300 | 1.85345 | 22.6 |
| 25 | −0.72320 | Variable | | |
| 26 | −21.87790 | 0.01390 | 1.97287 | 22.3 |
| 27 | 0.58150 | 0.00010 | 1.56732 | 42.8 |
| 28 | 0.58150 | 0.11220 | 1.49700 | 81.6 |
| 29 | −0.63630 | 0.00280 | | |
| 30 | 1.11030 | 0.05390 | 1.90069 | 32.3 |
| 31 | −4.63640 | 0.02260 | | |
| 32 | −3.84910 | 0.04000 | 1.94595 | 18.0 |
| 33 | −1.24500 | 0.01110 | 1.72342 | 38.0 |
| 34 | 0.85260 | Variable | | |
| 35 | 0.61970 | 0.06380 | 1.71300 | 53.9 |
| 36 | 4.84270 | Variable | | |
| 37 | −2.00340 | 0.04020 | 1.77051 | 24.8 |
| 38 | −1.01710 | 0.00300 | | |
| 39 | −1.80660 | 0.01190 | 1.82597 | 35.7 |
| 40 | 0.61790 | Variable | | |
| 41 | 1.13780 | 0.07670 | 1.75862 | 25.0 |
| 42 | −6.27170 | (BF) | | |
| Image surface | ∞ | | | |

TABLE 7

(Various data)
Zooming ratio 2.69929

| | Wide-angle limit | Middle position | Telephoto limit |
|---|---|---|---|
| Focal length | 1.0001 | 1.6436 | 2.6997 |
| F-number | 2.90615 | 2.90711 | 2.91261 |
| Half view angle | 16.8803 | 10.1861 | 6.2045 |
| Image height | 0.3000 | 0.3000 | 0.3000 |
| Overall length of lens system | 2.6889 | 3.1802 | 3.6839 |
| BF | 0.60442 | 0.60477 | 0.60481 |
| d5 | 0.0137 | 0.6274 | 1.1342 |
| d11 | 0.2232 | 0.0764 | 0.0138 |
| d25 | 0.1685 | 0.0908 | 0.0137 |
| d34 | 0.0549 | 0.0728 | 0.2065 |
| d36 | 0.2038 | 0.1921 | 0.0434 |
| d40 | 0.0371 | 0.1326 | 0.2842 |
| Entrance pupil position | 0.3442 | 1.4240 | 3.2362 |
| Exit pupil position | −2.3587 | −1.9023 | −2.9697 |
| Front principal points position | 1.0068 | 1.9901 | 3.8969 |
| Back principal points position | 1.6888 | 1.5366 | 0.9842 |

TABLE 8

(Single lens data)

| Lens element | Initial surface number | Focal length |
|---|---|---|
| 1 | 1 | −7.7566 |
| 2 | 2 | 2.8055 |
| 3 | 4 | 5.5428 |
| 4 | 6 | −1.3662 |
| 5 | 8 | −0.5233 |
| 6 | 9 | 0.8575 |
| 7 | 12 | −0.8098 |
| 8 | 14 | 0.4461 |
| 9 | 16 | 0.4702 |
| 10 | 18 | −0.4013 |
| 11 | 20 | −0.5034 |
| 12 | 22 | 1.8872 |
| 13 | 24 | 0.8291 |
| 14 | 26 | −0.5821 |
| 15 | 28 | 0.6306 |
| 16 | 30 | 0.9990 |
| 17 | 32 | 1.9310 |
| 18 | 33 | −0.6980 |
| 19 | 35 | 0.9905 |
| 20 | 37 | 2.6346 |
| 21 | 39 | −0.5562 |
| 22 | 41 | 1.2752 |

TABLE 9

(Zoom lens unit data)

| Lens unit | Initial surface No. | Focal length | Overall length of lens unit | Front principal points position | Back principal points position |
|---|---|---|---|---|---|
| 1 | 1 | 2.48620 | 0.21780 | 0.02854 | 0.10331 |
| 2 | 6 | −0.64857 | 0.20810 | 0.05780 | 0.09800 |
| 3 | 12 | 0.98834 | 0.50520 | −0.00958 | 0.12810 |
| 4 | 26 | 8.39219 | 0.25660 | 0.11783 | 0.22117 |
| 5 | 35 | 0.99046 | 0.06380 | −0.00543 | 0.02136 |
| 6 | 37 | −0.69995 | 0.05510 | 0.02624 | 0.04941 |
| 7 | 41 | 1.27522 | 0.07670 | 0.00673 | 0.03962 |

TABLE 10

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | −0.39268 | −0.62485 | −1.22106 |

TABLE 10-continued (Magnification of zoom lens unit)

| Lens unit | Initial surface No. | Wide-angle limit | Middle position | Telephoto limit |
|---|---|---|---|---|
| 3 | 12 | −4.14203 | −4.07743 | −1.74474 |
| 4 | 26 | 0.65508 | 0.65438 | 0.79199 |
| 5 | 35 | 0.26064 | 0.26146 | 0.39625 |
| 6 | 37 | 2.91503 | 3.05344 | 3.27028 |
| 7 | 41 | 0.49694 | 0.49668 | 0.49664 |

Numerical Example 3

The zoom lens system of Numerical Example 3 corresponds to Embodiment 3 shown in FIG. 7. Table 11 shows the surface data of the zoom lens system of Numerical Example 3. Table 12 shows the various data. Table 13 shows the single lens data. Table 14 shows the zoom lens unit data. Table 15 shows the magnification of zoom lens unit.

TABLE 11

(Surface data)

| Surface number | r | d | nd | vd |
|---|---|---|---|---|
| Object surface | ∞ | | | |
| 1 | 0.94530 | 0.06080 | 1.48749 | 70.4 |
| 2 | −15.88710 | 0.00640 | | |
| 3 | 0.68810 | 0.01400 | 1.83400 | 37.3 |
| 4 | 0.45290 | 0.00010 | 1.56732 | 42.8 |
| 5 | 0.45290 | 0.08570 | 1.49700 | 81.6 |
| 6 | 2.36770 | Variable | | |
| 7 | −1.31620 | 0.00860 | 1.73604 | 32.8 |
| 8 | 0.36770 | 0.00910 | | |
| 9 | 0.36450 | 0.02600 | 1.94595 | 18.0 |
| 10 | 1.30540 | Variable | | |
| 11 | 1.46790 | 0.01550 | 1.66839 | 53.7 |
| 12 | −1266.25570 | 0.00010 | 1.56732 | 42.8 |
| 13 | −1266.25570 | 0.00860 | 1.68157 | 33.4 |
| 14 | 0.29580 | 0.15670 | | |
| 15 | 0.46790 | 0.04680 | 1.67887 | 49.4 |
| 16 | −1.93220 | Variable | | |
| 17(Diaphragm) | ∞ | 0.01060 | | |
| 18 | 0.39080 | 0.00860 | 1.90498 | 23.0 |
| 19 | 0.21330 | 0.04890 | 1.54510 | 67.4 |
| 20 | −1.16050 | 0.00220 | | |
| 21 | 0.83510 | 0.01840 | 1.68131 | 57.1 |
| 22 | −15.45630 | Variable | | |
| 23 | 220.33300 | 0.00860 | 1.91082 | 35.2 |
| 24 | 0.28740 | 0.00870 | | |
| 25 | −7.73410 | 0.01340 | 1.94468 | 18.3 |
| 26 | −0.49230 | 0.00010 | 1.56732 | 42.8 |
| 27 | −0.49230 | 0.00860 | 1.81439 | 37.5 |
| 28 | 1.17440 | 0.01590 | | |
| 29 | 0.32420 | 0.02070 | 1.80716 | 42.6 |
| 30 | 12.70050 | Variable | | |
| 31 | −4.92090 | 0.00860 | 1.91082 | 35.2 |
| 32 | 0.29030 | 0.00010 | 1.56732 | 42.8 |
| 33 | 0.29030 | 0.03290 | 1.64138 | 30.5 |
| 34 | −0.25060 | 0.02790 | | |
| 35 | −0.22040 | 0.00860 | 1.91082 | 35.2 |
| 36 | 1.04280 | Variable | | |
| 37 | −64.36280 | 0.02530 | 1.91041 | 18.6 |
| 38 | −0.63330 | (BF) | | |
| Image surface | ∞ | | | |

TABLE 12

(Various data)
Zooming ratio 3.13356

| | Wide-angle limit | Middle position | Telephoto limit |
|---|---|---|---|
| Focal length | 1.0013 | 1.7725 | 3.1375 |
| F-number | 4.13568 | 4.79331 | 5.76960 |
| Half view angle | 6.6946 | 3.8152 | 2.1755 |
| Image height | 0.1200 | 0.1200 | 0.1200 |
| Overall length of lens system | 1.5332 | 1.8342 | 2.0682 |
| BF | 0.17303 | 0.17413 | 0.17424 |
| d6 | 0.0763 | 0.3779 | 0.6109 |
| d10 | 0.0525 | 0.0954 | 0.0812 |
| d16 | 0.2510 | 0.1307 | 0.0165 |
| d22 | 0.1288 | 0.0927 | 0.0153 |
| d30 | 0.0801 | 0.0222 | 0.0215 |
| d36 | 0.0650 | 0.2347 | 0.4421 |
| Entrance pupil position | 0.8682 | 2.1959 | 4.4763 |
| Exit pupil position | −0.3676 | −0.8867 | −3.2950 |
| Front principal points position | 0.0150 | 1.0068 | 4.7763 |
| Back principal points position | 0.5320 | 0.0617 | −1.0693 |

TABLE 13

(Single lens data)

| Lens element | Initial surface number | Focal length |
|---|---|---|
| 1 | 1 | 1.8324 |
| 2 | 3 | −1.6329 |
| 3 | 5 | 1.1103 |
| 4 | 7 | −0.3896 |
| 5 | 9 | 0.5275 |
| 6 | 11 | 2.1937 |
| 7 | 13 | −0.4339 |
| 8 | 15 | 0.5593 |
| 9 | 18 | −0.5312 |
| 10 | 19 | 0.3348 |
| 11 | 21 | 1.1634 |
| 12 | 23 | −0.3160 |
| 13 | 25 | 0.5561 |
| 14 | 27 | −0.4250 |
| 15 | 29 | 0.4119 |
| 16 | 31 | −0.3007 |
| 17 | 33 | 0.2148 |
| 18 | 35 | −0.1991 |
| 19 | 37 | 0.7024 |

TABLE 14

(Zoom lens unit data)

| Lens unit | Initial surface No. | Focal length | Overall length of lens unit | Front principal points position | Back principal points position |
|---|---|---|---|---|---|
| 1 | 1 | 1.21626 | 0.16700 | −0.00636 | 0.05052 |
| 2 | 7 | −1.54763 | 0.04370 | −0.01102 | 0.00526 |
| 3 | 11 | 2.10832 | 0.22770 | 0.61600 | 0.81816 |
| 4 | 17 | 0.51768 | 0.08870 | 0.03292 | 0.06074 |
| 5 | 23 | −0.97662 | 0.07600 | −0.07038 | −0.05601 |
| 6 | 31 | −0.29263 | 0.07810 | 0.05868 | 0.08022 |
| 7 | 37 | 0.70240 | 0.02530 | 0.01337 | 0.02543 |

TABLE 15

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | 3.01602 | 1.89955 | 1.47712 |
| 3 | 11 | 0.46629 | 0.76648 | 0.99869 |
| 4 | 17 | 0.26555 | 0.36029 | 0.48770 |
| 5 | 23 | 1.43034 | 1.40373 | 1.42720 |
| 6 | 31 | 2.04435 | 2.63092 | 3.34033 |
| 7 | 37 | 0.75385 | 0.75228 | 0.75212 |

Numerical Example 4

Figure 10:
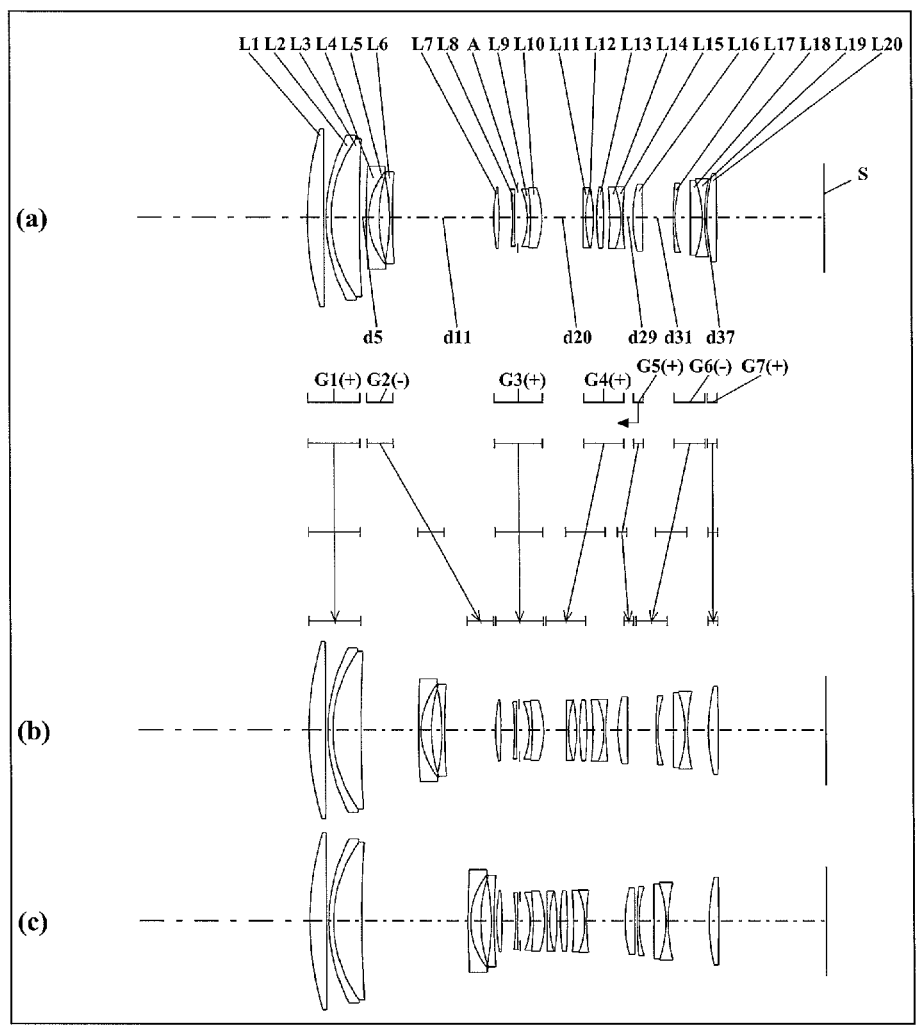
FIG. 10 is a lens arrangement diagram showing an infinity in-focus condition of a zoom lens system according to Embodiment 4 (Numerical Example 4)
Figure 11:
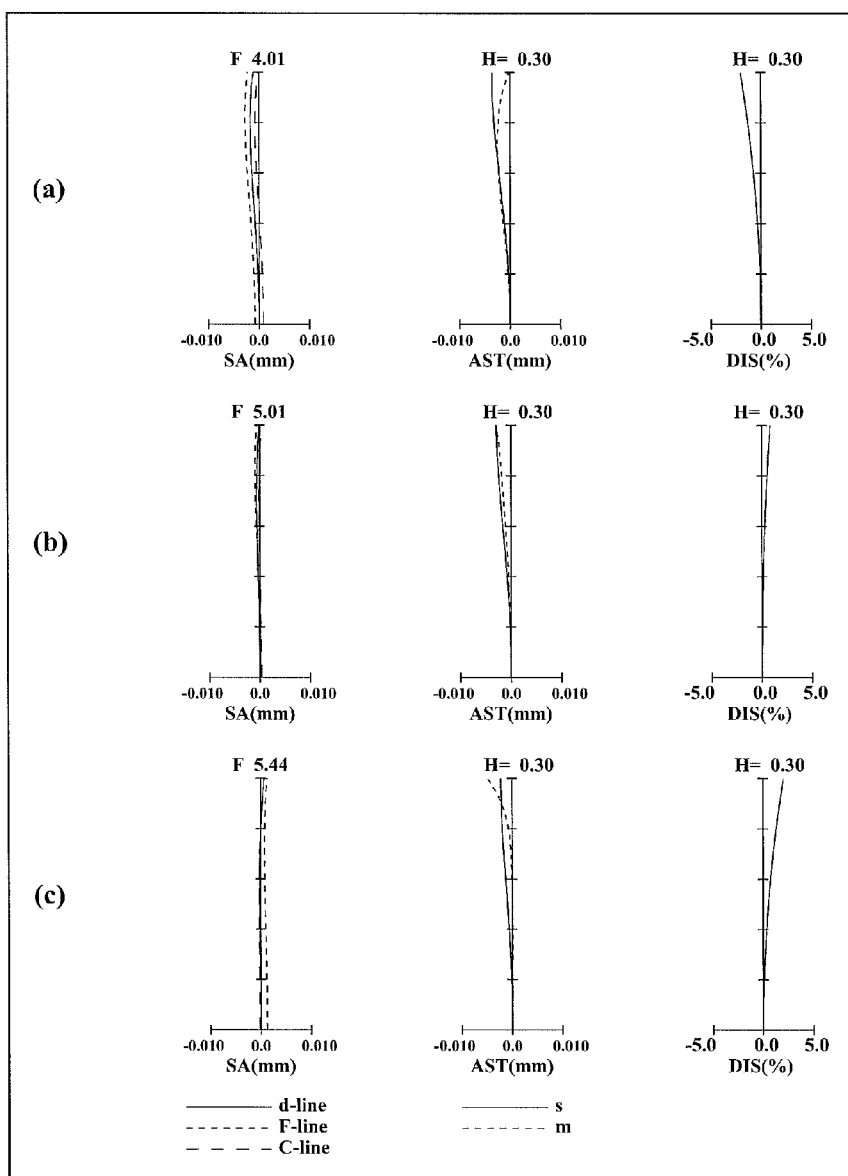
FIG. 11 is a longitudinal aberration diagram showing an infinity in-focus condition of the zoom lens system according to Numerical Example 4.
Figure 12:
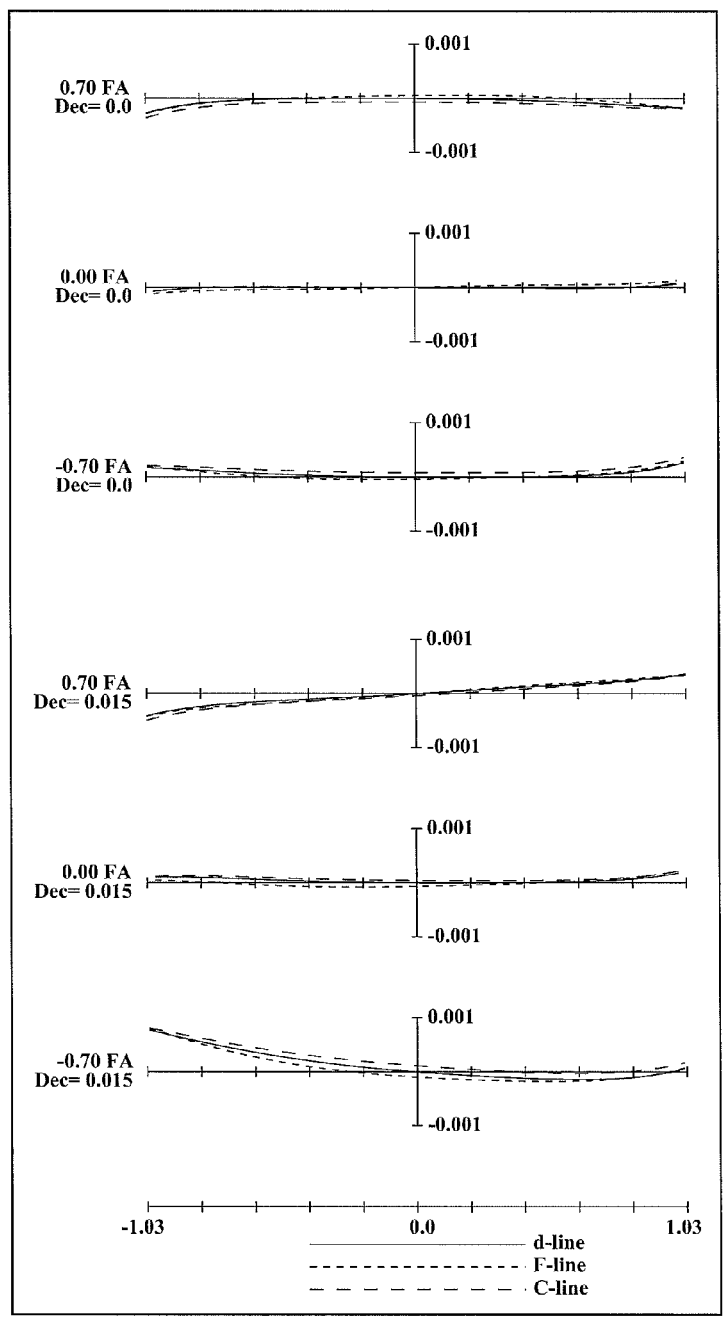
FIG. 12 is a lateral aberration diagram of the zoom lens system according to Numerical Example 4 at a telephoto limit in a basic state where image blur compensation is not performed and in an image blur compensation state.

The zoom lens system of Numerical Example 4 corresponds to Embodiment 4 shown in FIG. 10. Table 16 shows the surface data of the zoom lens system of Numerical Example 4. Table 17 shows the various data. Table 18 shows the single lens data. Table 19 shows the zoom lens unit data. Table 20 shows the magnification of zoom lens unit.

TABLE 16

(Surface data)

| Surface number | r | d | nd | vd |
|---|---|---|---|---|
| Object surface | ∞ | | | |
| 1 | 1.88350 | 0.09710 | 1.59349 | 67.0 |
| 2 | −108.89530 | 0.01310 | | |
| 3 | 1.02890 | 0.02770 | 1.90366 | 31.3 |
| 4 | 0.79250 | 0.16650 | 1.43700 | 95.1 |
| 5 | 7.28390 | Variable | | |
| 6 | 5.77060 | 0.01420 | 1.90366 | 31.3 |
| 7 | 0.43310 | 0.00010 | 1.56732 | 42.8 |
| 8 | 0.43310 | 0.06050 | 1.94595 | 18.0 |
| 9 | 0.86160 | 0.06170 | | |
| 10 | −1.24340 | 0.01660 | 1.61800 | 63.4 |
| 11 | 3.90340 | Variable | | |
| 12 | 0.96730 | 0.03060 | 2.00100 | 29.1 |
| 13 | −2.55190 | 0.08070 | | |
| 14 | −1.66460 | 0.01110 | 1.94595 | 18.0 |
| 15 | 5.01040 | 0.01640 | | |
| 16(Diaphragm) | ∞ | 0.05780 | | |
| 17 | −0.44640 | 0.01760 | 1.84666 | 23.8 |
| 18 | −1.49340 | 0.00010 | 1.56732 | 42.8 |
| 19 | −1.49340 | 0.06770 | 1.80518 | 25.5 |
| 20 | −0.51710 | Variable | | |
| 21 | 81.16970 | 0.01390 | 2.00069 | 25.5 |
| 22 | 0.63010 | 0.00010 | 1.56732 | 42.8 |
| 23 | 0.63010 | 0.04560 | 1.60625 | 63.7 |
| 24 | −0.93760 | 0.02300 | | |
| 25 | 1.31480 | 0.04060 | 2.00100 | 29.1 |
| 26 | −2.35590 | 0.03650 | | |
| 27 | −2.02150 | 0.06470 | 1.94595 | 18.0 |
| 28 | −0.47730 | 0.01110 | 1.84445 | 24.1 |
| 29 | 1.45800 | Variable | | |
| 30 | 0.78680 | 0.05550 | 1.66949 | 51.3 |
| 31 | 16.60660 | Variable | | |
| 32 | 2.07090 | 0.01110 | 1.90193 | 24.6 |
| 33 | 0.69120 | 0.08950 | | |
| 34 | −24.33810 | 0.06940 | 1.62520 | 32.7 |
| 35 | −0.64770 | 0.00010 | 1.56732 | 42.8 |
| 36 | −0.64770 | 0.01390 | 1.61072 | 50.1 |
| 37 | 1.02270 | Variable | | |
| 38 | 1.11170 | 0.05670 | 1.95375 | 32.3 |
| 39 | −18.78820 | (BF) | | |
| Image surface | ∞ | | | |

TABLE 17

(Various data)
Zooming ratio 2.70029

| | Wide-angle limit | Middle position | Telephoto limit |
|---|---|---|---|
| Focal length | 0.9998 | 1.6429 | 2.6998 |
| F-number | 4.00550 | 5.00777 | 5.52762 |
| Half view angle | 17.0465 | 10.2795 | 6.2241 |
| Image height | 0.3000 | 0.3000 | 0.3000 |
| Overall length of lens system | 3.0336 | 3.0326 | 3.0309 |
| BF | 0.63092 | 0.63113 | 0.63135 |
| d5 | 0.0409 | 0.3381 | 0.6239 |
| d11 | 0.5969 | 0.2997 | 0.0139 |
| d20 | 0.2428 | 0.1311 | 0.0138 |
| d29 | 0.0569 | 0.0685 | 0.2228 |
| d31 | 0.1802 | 0.1686 | 0.0143 |
| d37 | 0.0138 | 0.1243 | 0.2397 |
| Entrance pupil position | 1.0719 | 1.7638 | 2.5155 |
| Exit pupil position | −1.1279 | −1.3879 | −2.0066 |
| Front principal points position | 1.5034 | 2.0699 | 2.4521 |
| Back principal points position | 2.0338 | 1.3897 | 0.3311 |

TABLE 18

(Single lens data)

| Lens element | Initial surface number | Focal length |
|---|---|---|
| 1 | 1 | 3.1206 |
| 2 | 3 | −4.0418 |
| 3 | 4 | 2.0191 |
| 4 | 6 | −0.5188 |
| 5 | 8 | 0.8615 |
| 6 | 10 | −1.5240 |
| 7 | 12 | 0.7038 |
| 8 | 14 | −1.3198 |
| 9 | 17 | −0.7579 |
| 10 | 19 | 0.9529 |
| 11 | 21 | −0.6346 |
| 12 | 23 | 0.6285 |
| 13 | 25 | 0.8477 |
| 14 | 27 | 0.6474 |
| 15 | 28 | −0.4247 |
| 16 | 30 | 1.2319 |
| 17 | 32 | −1.1547 |
| 18 | 34 | 1.0631 |
| 19 | 36 | −0.6473 |
| 20 | 38 | 1.1020 |

TABLE 19

(Zoom lens unit data)

| Lens unit | Initial surface No. | Focal length | Overall length of lens unit | Front principal points position | Back principal points position |
|---|---|---|---|---|---|
| 1 | 1 | 1.78602 | 0.30440 | 0.00292 | 0.10509 |
| 2 | 6 | −0.65832 | 0.15310 | 0.07284 | 0.11596 |
| 3 | 12 | 1.76357 | 0.28200 | −0.03582 | 0.00490 |
| 4 | 21 | 2.17618 | 0.23550 | −0.02427 | 0.06565 |
| 5 | 30 | 1.23195 | 0.05550 | −0.00165 | 0.02065 |
| 6 | 32 | −0.65020 | 0.18400 | 0.06196 | 0.10554 |
| 7 | 38 | 1.10203 | 0.05670 | 0.00162 | 0.02926 |

TABLE 20

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | −0.80810 | −1.27223 | −2.84181 |
| 3 | 12 | −70.66296 | −52.95295 | −2.25868 |
| 4 | 21 | 0.01699 | 0.02245 | 0.28423 |
| 5 | 30 | 0.39159 | 0.39453 | 0.51361 |
| 6 | 32 | 3.65944 | 3.83138 | 4.01092 |
| 7 | 38 | 0.40259 | 0.40240 | 0.40221 |

Numerical Example 5

The zoom lens system of Numerical Example 5 corresponds to Embodiment 5 shown in FIG. 13. Table 21 shows the surface data of the zoom lens system of Numerical Example 5. Table 22 shows the various data. Table 23 shows the single lens data. Table 24 shows the zoom lens unit data. Table 25 shows the magnification of zoom lens unit.

TABLE 21

(Surface data)

| Surface number | r | d | nd | vd |
|---|---|---|---|---|
| Object surface | ∞ | | | |
| 1 | 1.60410 | 0.03350 | 1.92286 | 20.9 |
| 2 | 1.13700 | 0.00010 | 1.51400 | 42.8 |
| 3 | 1.13700 | 0.11710 | 1.49700 | 81.6 |
| 4 | −22.50320 | 0.00280 | | |
| 5 | 1.01910 | 0.10000 | 1.49700 | 81.6 |
| 6 | 5.55470 | Variable | | |
| 7 | 6.97570 | 0.03240 | 1.92286 | 20.9 |
| 8 | −2.73300 | 0.00010 | 1.51400 | 42.8 |
| 9 | −2.73300 | 0.02230 | 1.70154 | 41.1 |
| 10 | 0.52810 | 0.09940 | | |
| 11 | −4.22290 | 0.02230 | 1.53172 | 48.8 |
| 12 | 0.59480 | 0.00010 | 1.51400 | 42.8 |
| 13 | 0.59480 | 0.06150 | 1.92286 | 20.9 |
| 14 | 2.34280 | 0.10190 | | |
| 15 | −0.86880 | 0.02230 | 1.70154 | 41.1 |
| 16 | −2.99080 | Variable | | |
| 17 | 1.06820 | 0.08280 | 1.71300 | 53.9 |
| 18 | −1.26650 | Variable | | |
| 19 | −0.68090 | 0.01810 | 1.74400 | 44.8 |
| 20 | −1.31120 | Variable | | |
| 21(Diaphragm) | ∞ | 0.02090 | | |
| 22 | 1.08670 | 0.07280 | 1.59349 | 67.0 |
| 23 | −0.93820 | 0.00140 | | |
| 24 | 0.60410 | 0.09380 | 1.49700 | 81.6 |
| 25 | −0.72040 | 0.00010 | 1.51400 | 42.8 |
| 26 | −0.72040 | 0.01670 | 1.92286 | 20.9 |
| 27 | 4.12450 | Variable | | |
| 28 | 3.64130 | 0.01810 | 1.63854 | 55.4 |
| 29 | 0.61440 | Variable | | |
| 30 | −2.28630 | 0.07670 | 1.84666 | 23.8 |
| 31 | −0.26940 | 0.00010 | 1.56732 | 42.8 |
| 32 | −0.26940 | 0.01530 | 1.80610 | 33.3 |
| 33 | 0.88250 | 0.03110 | | |
| 34 | −2.33420 | 0.01390 | 1.80610 | 33.3 |
| 35 | 1.47710 | 0.05980 | | |
| 36 | −73.63660 | 0.04530 | 1.80420 | 46.5 |
| 37 | −0.81040 | Variable | | |
| 38 | 1.21240 | 0.08790 | 1.78472 | 25.7 |
| 39 | −1.29380 | Variable | | |
| 40 | −0.98760 | 0.02230 | 1.80610 | 33.3 |
| 41 | 0.85260 | 0.00560 | | |
| 42 | 0.56750 | 0.13730 | 1.51680 | 64.2 |
| 43 | −2.29860 | (BF) | | |
| Image surface | ∞ | | | |

TABLE 22

(Various data)
Zooming ratio 2.71543

| | Wide-angle limit | Middle position | Telephoto limit |
|---|---|---|---|
| Focal length | 1.0002 | 1.6482 | 2.7160 |
| F-number | 2.91935 | 2.91743 | 2.91243 |
| Half view angle | 17.0206 | 10.2543 | 6.1804 |
| Image height | 0.3000 | 0.3000 | 0.3000 |
| Overall length of lens system | 3.0482 | 3.0483 | 3.0485 |
| BF | 0.26935 | 0.26950 | 0.26945 |
| d6 | 0.0209 | 0.2954 | 0.5341 |
| d16 | 0.5832 | 0.2821 | 0.0209 |
| d18 | 0.1008 | 0.1264 | 0.1265 |
| d20 | 0.0989 | 0.0999 | 0.1224 |
| d27 | 0.0294 | 0.0611 | 0.0147 |
| d29 | 0.1651 | 0.1334 | 0.1799 |
| d37 | 0.0684 | 0.1247 | 0.2244 |
| d39 | 0.2764 | 0.2200 | 0.1204 |
| Entrance pupil position | 1.1041 | 1.9600 | 3.2062 |
| Exit pupil position | −1.1083 | −1.2167 | −1.5255 |
| Front principal points position | 1.3781 | 1.7803 | 1.8124 |
| Back principal points position | 2.0480 | 1.4001 | 0.3325 |

TABLE 23

(Single lens data)

| Lens element | Initial surface number | Focal length |
|---|---|---|
| 1 | 1 | −4.3819 |
| 2 | 3 | 2.1813 |
| 3 | 5 | 2.4930 |
| 4 | 7 | 2.1312 |
| 5 | 9 | −0.6291 |
| 6 | 11 | −0.9790 |
| 7 | 13 | 0.8495 |
| 8 | 15 | −1.7530 |
| 9 | 17 | 0.8249 |
| 10 | 19 | −1.9274 |
| 11 | 22 | 0.8599 |
| 12 | 24 | 0.6770 |
| 13 | 26 | −0.6634 |
| 14 | 28 | −1.1602 |
| 15 | 30 | 0.3545 |
| 16 | 32 | −0.2545 |
| 17 | 34 | −1.1204 |
| 18 | 36 | 1.0186 |
| 19 | 38 | 0.8101 |
| 20 | 40 | −0.5646 |
| 21 | 42 | 0.8953 |

TABLE 24

(Zoom lens unit data)

| Lens unit | Initial surface No. | Focal length | Overall length of lens unit | Front principal points position | Back principal points position |
|---|---|---|---|---|---|
| 1 | 1 | 1.61863 | 0.25350 | 0.04746 | 0.13457 |
| 2 | 7 | −0.60211 | 0.36230 | 0.11260 | 0.20397 |
| 3 | 17 | 0.82489 | 0.08280 | 0.02245 | 0.05619 |
| 4 | 19 | −1.92745 | 0.01810 | −0.01135 | −0.00376 |
| 5 | 21 | 0.78508 | 0.20570 | 0.00494 | 0.07817 |
| 6 | 28 | −1.16020 | 0.01810 | 0.01332 | 0.02035 |
| 7 | 30 | −1.14787 | 0.24220 | −0.07461 | −0.03596 |

TABLE 24-continued (Zoom lens unit data)

| Lens unit | Initial surface No. | Focal length | Overall length of lens unit | Front principal points position | Back principal points position |
|---|---|---|---|---|---|
| 8 | 38 | 0.81009 | 0.08790 | 0.02420 | 0.06208 |
| 9 | 40 | −1.67822 | 0.16520 | −0.04873 | 0.00368 |

TABLE 25

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.78800 | −1.22982 | −2.39987 |
| 3 | 17 | −0.81217 | −0.84123 | −0.57933 |
| 4 | 19 | 3.51295 | 3.50254 | 2.51480 |
| 5 | 21 | 0.14266 | 0.14321 | 0.22080 |
| 6 | 28 | 1.76489 | 1.68265 | 1.64796 |
| 7 | 30 | 3.29195 | 2.78334 | 2.29964 |
| 8 | 38 | 0.26386 | 0.33336 | 0.45635 |
| 9 | 40 | 1.25674 | 1.25683 | 1.25680 |

Numerical Example 6

Figure 16:
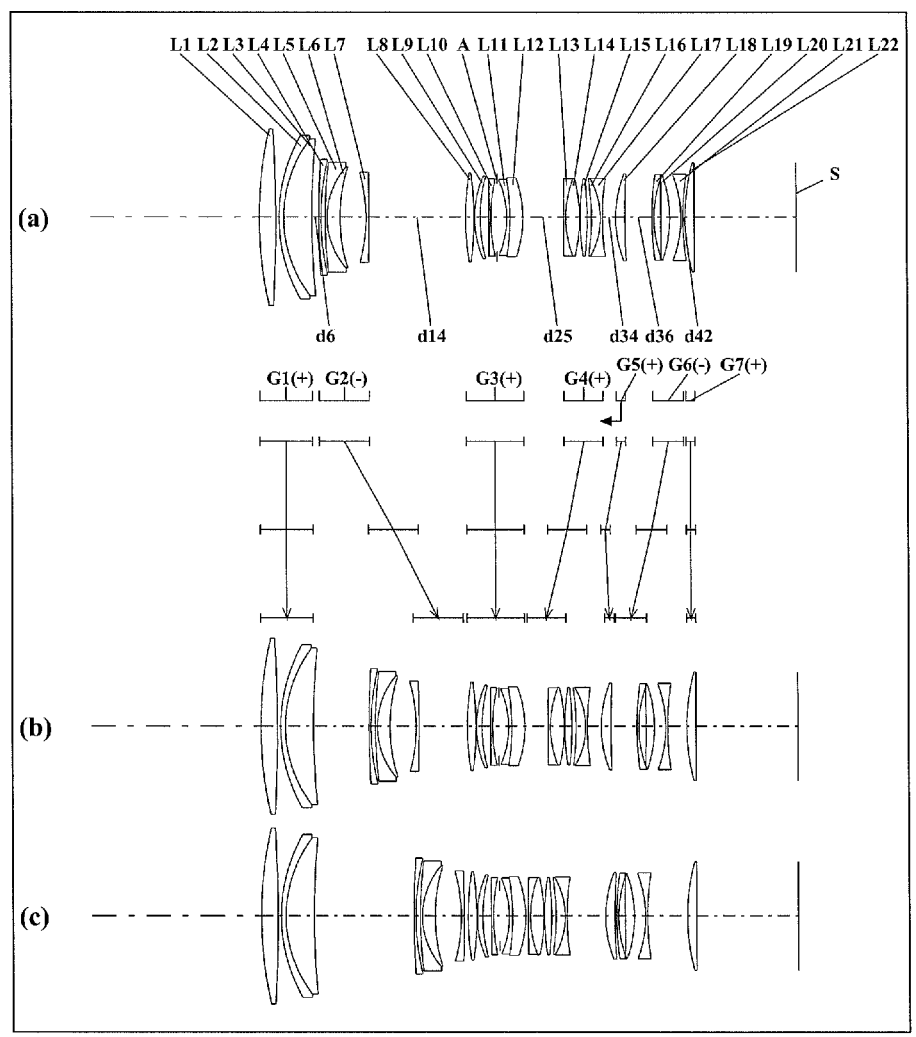
FIG. 16 is a lens arrangement diagram showing an infinity in-focus condition of a zoom lens system according to Embodiment 6 (Numerical Example 6)
Figure 17:
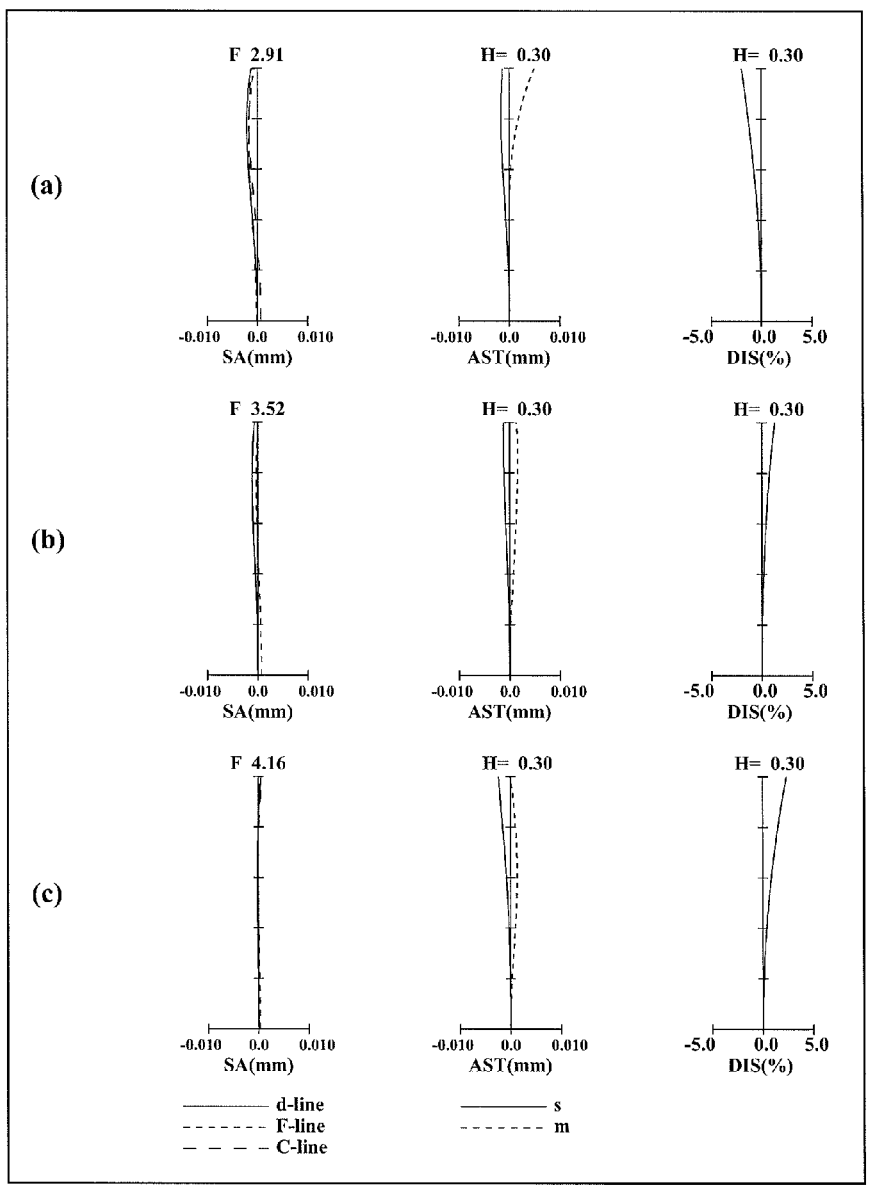
FIG. 17 is a longitudinal aberration diagram showing an infinity in-focus condition of the zoom lens system according to Numerical Example 6.
Figure 18:
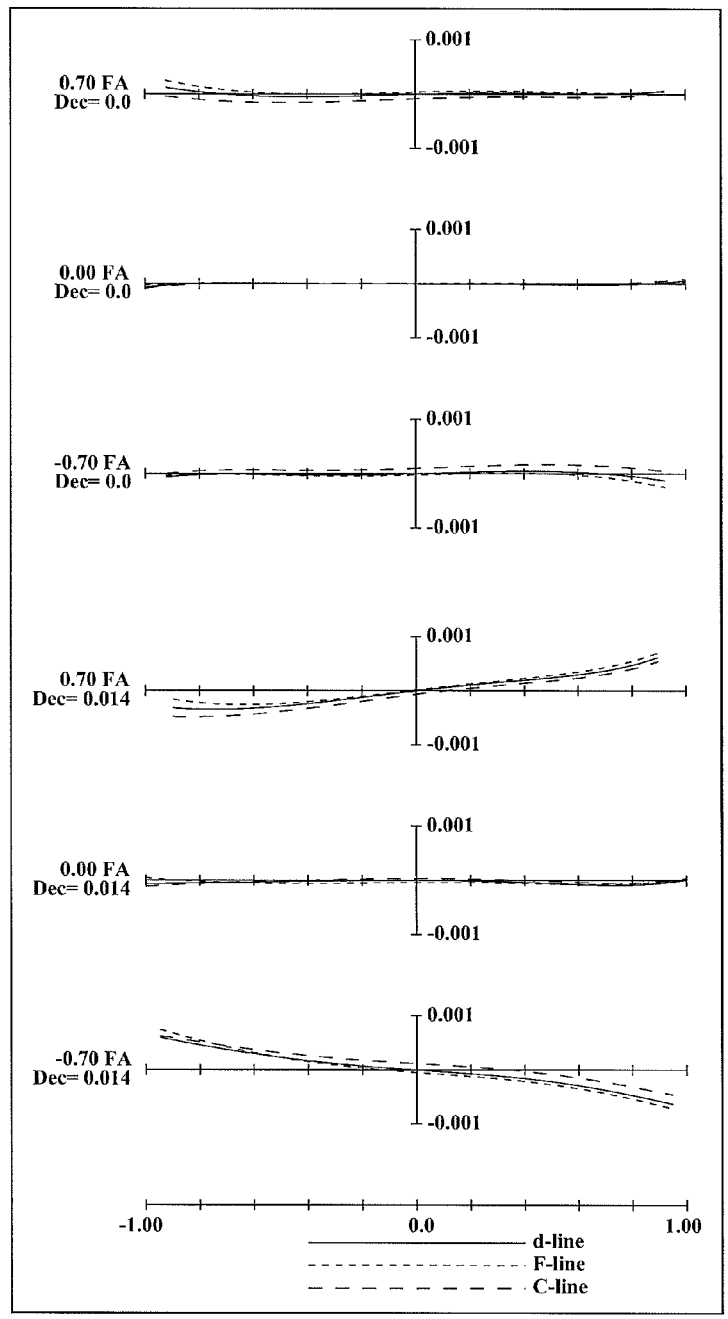
FIG. 18 is a lateral aberration diagram of the zoom lens system according to Numerical Example 6 at a telephoto limit in a basic state where image blur compensation is not performed and in an image blur compensation state.

The zoom lens system of Numerical Example 6 corresponds to Embodiment 6 shown in FIG. 16. Table 26 shows the surface data of the zoom lens system of Numerical Example 6. Table 27 shows the various data. Table 28 shows the single lens data. Table 29 shows the zoom lens unit data. Table 30 shows the magnification of zoom lens unit.

TABLE 26

(Surface data)

| Surface number | r | d | nd | vd |
|---|---|---|---|---|
| Object surface | ∞ | | | |
| 1 | 2.32170 | 0.09710 | 1.59349 | 67.0 |
| 2 | −9.20480 | 0.02050 | | |
| 3 | 0.97930 | 0.02770 | 1.90366 | 31.3 |
| 4 | 0.76620 | 0.00010 | 1.56732 | 42.8 |
| 5 | 0.76620 | 0.16640 | 1.43700 | 95.1 |
| 6 | 4.79020 | Variable | | |
| 7 | 5.56420 | 0.01110 | 1.80610 | 40.7 |
| 8 | 1.42340 | 0.02610 | | |
| 9 | 2.60230 | 0.01180 | 1.90366 | 31.3 |
| 10 | 0.45590 | 0.00010 | 1.56732 | 42.8 |
| 11 | 0.45590 | 0.07570 | 1.94595 | 18.0 |
| 12 | 0.99970 | 0.15470 | | |
| 13 | −0.97480 | 0.01660 | 1.62041 | 60.3 |
| 14 | −15.50240 | Variable | | |
| 15 | 1.55190 | 0.05040 | 2.00100 | 29.1 |
| 16 | −2.03660 | 0.00280 | | |
| 17 | 0.61080 | 0.03340 | 1.90366 | 31.3 |
| 18 | 0.90650 | 0.05180 | | |
| 19 | 290.09000 | 0.01110 | 1.94595 | 18.0 |
| 20 | 1.00180 | 0.03780 | | |
| 21(Diaphragm) | ∞ | 0.05700 | | |
| 22 | −0.55200 | 0.01860 | 1.80518 | 25.5 |
| 23 | −1.39030 | 0.00010 | 1.56732 | 42.8 |
| 24 | −1.39030 | 0.07820 | 1.80610 | 33.3 |
| 25 | −0.66510 | Variable | | |
| 26 | 10.66260 | 0.01390 | 2.00069 | 25.5 |
| 27 | 0.63010 | 0.00010 | 1.56732 | 42.8 |
| 28 | 0.63010 | 0.08160 | 1.59349 | 67.0 |
| 29 | −0.95520 | 0.00280 | | |
| 30 | 1.46280 | 0.04130 | 2.00100 | 29.1 |
| 31 | −2.15820 | 0.02550 | | |
| 32 | −1.54350 | 0.05480 | 1.94595 | 18.0 |
| 33 | −0.45360 | 0.01110 | 1.84400 | 24.8 |
| 34 | 1.54380 | Variable | | |
| 35 | 0.70320 | 0.05550 | 1.65020 | 55.7 |
| 36 | 4.88560 | Variable | | |
| 37 | 1.80000 | 0.01110 | 1.95375 | 32.3 |
| 38 | 0.67990 | 0.04110 | | |
| 39 | −22.42540 | 0.05200 | 1.64000 | 60.2 |
| 40 | −0.74810 | 0.06600 | | |
| 41 | −0.70750 | 0.01110 | 1.60000 | 42.5 |
| 42 | 1.54170 | Variable | | |
| 43 | 1.21950 | 0.05410 | 1.94595 | 18.0 |
| 44 | −4077.01000 | (BF) | | |
| Image surface | ∞ | | | |

TABLE 27

(Various data)
Zooming ratio 2.69995

| | Wide-angle limit | Middle position | Telephoto limit |
|---|---|---|---|
| Focal length | 0.9999 | 1.6429 | 2.6997 |
| F-number | 2.90603 | 3.51911 | 4.15887 |
| Half view angle | 17.0123 | 10.2236 | 6.1983 |
| Image height | 0.3000 | 0.3000 | 0.3000 |
| Overall length of lens system | 3.1785 | 3.1778 | 3.1775 |
| BF | 0.60326 | 0.60323 | 0.60311 |
| d6 | 0.0409 | 0.3278 | 0.5911 |
| d14 | 0.5736 | 0.2867 | 0.0235 |
| d25 | 0.2382 | 0.1374 | 0.0138 |
| d34 | 0.0782 | 0.0834 | 0.2282 |
| d36 | 0.1594 | 0.1542 | 0.0094 |
| d42 | 0.0138 | 0.1140 | 0.2373 |
| Entrance pupil position | 1.2342 | 2.0389 | 3.0171 |
| Exit pupil position | −1.0667 | −1.2214 | −1.6467 |
| Front principal points position | 1.6354 | 2.2025 | 2.4773 |
| Back principal points position | 2.1785 | 1.5349 | 0.4778 |

TABLE 28

(Single lens data)

| Lens element | Initial surface number | Focal length |
|---|---|---|
| 1 | 1 | 3.1338 |
| 2 | 3 | −4.1527 |
| 3 | 5 | 2.0612 |
| 4 | 7 | −2.3756 |
| 5 | 9 | −0.6133 |
| 6 | 11 | 0.8298 |
| 7 | 13 | −1.6774 |
| 8 | 15 | 0.8861 |
| 9 | 17 | 1.9667 |
| 10 | 19 | −1.0627 |
| 11 | 22 | −1.1483 |
| 12 | 24 | 1.5092 |
| 13 | 26 | −0.6697 |
| 14 | 28 | 0.6522 |
| 15 | 30 | 0.8760 |
| 16 | 32 | 0.6629 |
| 17 | 33 | −0.4143 |
| 18 | 35 | 1.2568 |

TABLE 28-continued (Single lens data)

| Lens element | Initial surface number | Focal length |
|---|---|---|
| 19 | 37 | −1.1512 |
| 20 | 39 | 1.2081 |
| 21 | 41 | −0.8068 |
| 22 | 43 | 1.2888 |

TABLE 29

(Zoom lens unit data)

| Lens unit | Initial surface No. | Focal length | Overall length of lens unit | Front principal points position | Back principal points position |
|---|---|---|---|---|---|
| 1 | 1 | 1.79907 | 0.31180 | 0.00412 | 0.10730 |
| 2 | 7 | −0.61764 | 0.29610 | 0.12646 | 0.19050 |
| 3 | 15 | 1.46099 | 0.34120 | −0.06833 | 0.00958 |
| 4 | 26 | 2.83919 | 0.23110 | 0.00853 | 0.10393 |
| 5 | 35 | 1.25678 | 0.05550 | −0.00563 | 0.01642 |
| 6 | 37 | −0.76636 | 0.18130 | 0.09141 | 0.13018 |
| 7 | 43 | 1.28881 | 0.05410 | 0.00001 | 0.02631 |

TABLE 30

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.76292 | −1.18169 | −2.38127 |
| 3 | 15 | −6.12004 | −6.94152 | −2.12298 |
| 4 | 26 | 0.22421 | 0.20332 | 0.40284 |
| 5 | 35 | 0.38556 | 0.37926 | 0.48292 |
| 6 | 37 | 2.69818 | 2.82876 | 2.98905 |
| 7 | 43 | 0.51036 | 0.51038 | 0.51048 |

Numerical Example 7

Figure 19:
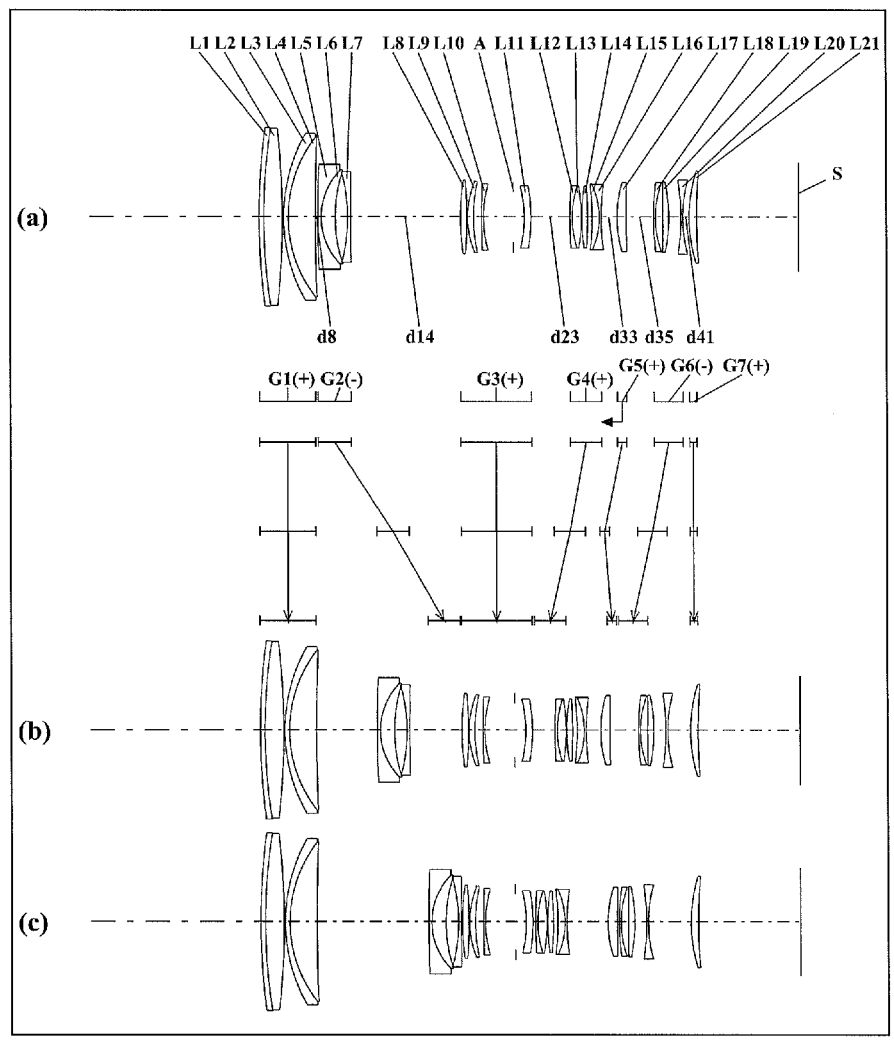
FIG. 19 is a lens arrangement diagram showing an infinity in-focus condition of a zoom lens system according to Embodiment 7 (Numerical Example 7)
Figure 20:
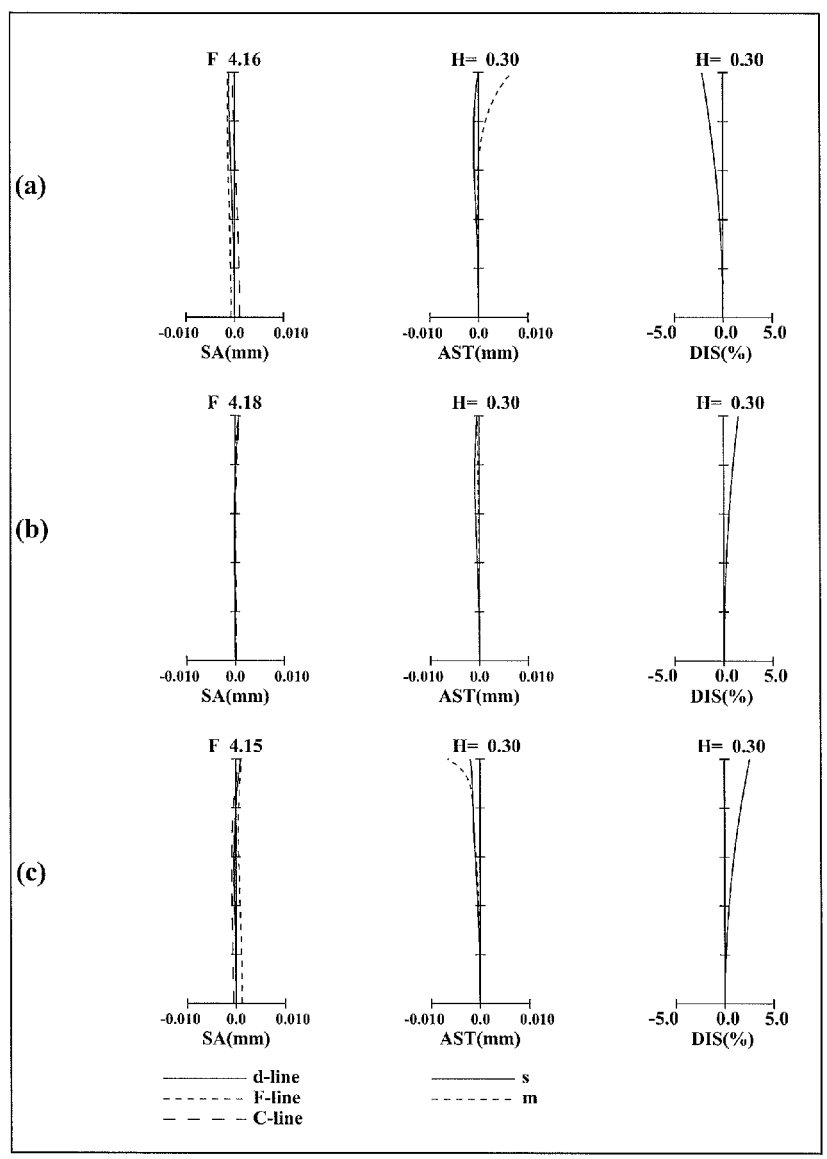
FIG. 20 is a longitudinal aberration diagram showing an infinity in-focus condition of the zoom lens system according to Numerical Example 7.
Figure 21:
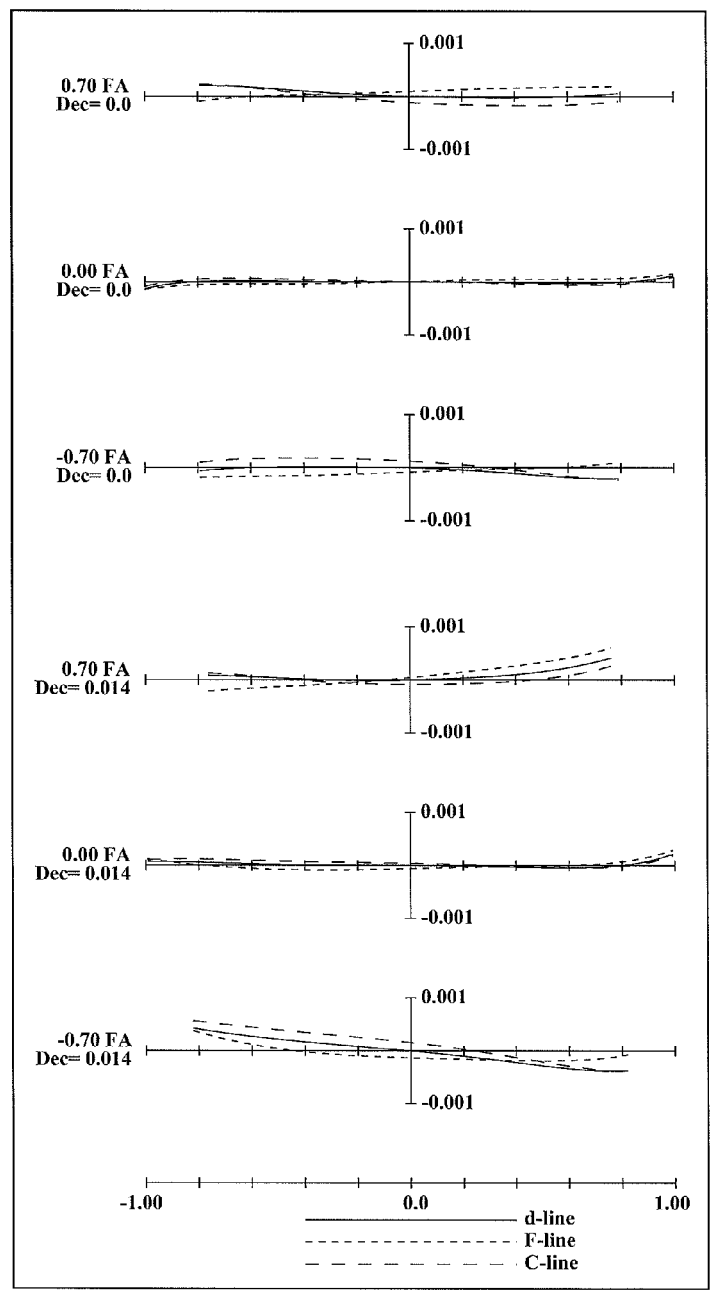
FIG. 21 is a lateral aberration diagram of the zoom lens system according to Numerical Example 7 at a telephoto limit in a basic state where image blur compensation is not performed and in an image blur compensation state.

The zoom lens system of Numerical Example 7 corresponds to Embodiment 7 shown in FIG. 19. Table 31 shows the surface data of the zoom lens system of Numerical Example 7. Table 32 shows the various data. Table 33 shows the single lens data. Table 34 shows the zoom lens unit data. Table 35 shows the magnification of zoom lens unit.

TABLE 31

(Surface data)

| Surface number | r | d | nd | vd |
|---|---|---|---|---|
| Object surface | ∞ | | | |
| 1 | 3.87160 | 0.02770 | 1.95375 | 32.3 |
| 2 | 3.28500 | 0.00010 | 1.56732 | 42.8 |
| 3 | 3.28500 | 0.11090 | 1.49700 | 81.6 |
| 4 | −4.72170 | 0.00690 | | |
| 5 | 0.99170 | 0.02770 | 1.90366 | 31.3 |
| 6 | 0.76690 | 0.00010 | 1.56732 | 42.8 |
| 7 | 0.76690 | 0.15900 | 1.49700 | 81.6 |
| 8 | 11.01440 | Variable | | |
| 9 | 8.73340 | 0.01790 | 1.90366 | 31.3 |
| 10 | 0.39550 | 0.00010 | 1.56732 | 42.8 |
| 11 | 0.39550 | 0.08310 | 1.94595 | 18.0 |
| 12 | 0.85530 | 0.07360 | | |
| 13 | −0.99390 | 0.01660 | 1.62041 | 60.3 |
| 14 | 19.52530 | Variable | | |
| 15 | 1.43860 | 0.03860 | 2.00100 | 29.1 |
| 16 | −2.66120 | 0.00420 | | |
| 17 | 0.56020 | 0.03380 | 1.90366 | 31.3 |
| 18 | 0.91930 | 0.04880 | | |
| 19 | 6.74450 | 0.01110 | 1.94595 | 18.0 |
| 20 | 0.71960 | 0.17570 | | |
| 21(Diaphragm) | ∞ | 0.06480 | | |
| 22 | −0.76950 | 0.03940 | 1.80518 | 25.5 |
| 23 | −1.03050 | Variable | | |
| 24 | 2.78940 | 0.01390 | 2.00069 | 25.5 |
| 25 | 0.59520 | 0.00010 | 1.56732 | 42.8 |
| 26 | 0.59520 | 0.05370 | 1.59349 | 67.0 |
| 27 | −1.06140 | 0.00280 | | |
| 28 | 1.16430 | 0.03400 | 2.00100 | 29.1 |
| 29 | −2.77460 | 0.02650 | | |
| 30 | −1.66350 | 0.04310 | 1.94595 | 18.0 |
| 31 | −0.45640 | 0.00010 | 1.56732 | 42.8 |
| 32 | −0.45640 | 0.01110 | 1.84400 | 24.8 |
| 33 | 1.35130 | Variable | | |
| 34 | 0.68970 | 0.05550 | 1.65020 | 55.7 |
| 35 | 15.35910 | Variable | | |
| 36 | 1.58280 | 0.01110 | 1.95375 | 32.3 |
| 37 | 0.58680 | 0.04290 | | |
| 38 | 17.87970 | 0.03650 | 1.64000 | 60.2 |
| 39 | −1.01120 | 0.07140 | | |
| 40 | −1.39760 | 0.01120 | 1.60000 | 42.5 |
| 41 | 0.84930 | Variable | | |
| 42 | 0.91290 | 0.04350 | 1.94595 | 18.0 |
| 43 | 3.16790 | (BF) | | |
| Image surface | ∞ | | | |

TABLE 32

(Various data)
Zooming ratio 3.19784

| | Wide-angle limit | Middle position | Telephoto limit |
|---|---|---|---|
| Focal length | 0.9999 | 1.7886 | 3.1977 |
| F-number | 4.16082 | 4.18075 | 4.15496 |
| Half view angle | 17.0443 | 9.3827 | 5.2257 |
| Image height | 0.3000 | 0.3000 | 0.3000 |
| Overall length of lens system | 3.1897 | 3.1891 | 3.1895 |
| BF | 0.60369 | 0.60375 | 0.60412 |
| d8 | 0.0161 | 0.3591 | 0.6595 |
| d14 | 0.6502 | 0.3073 | 0.0069 |
| d23 | 0.2300 | 0.1325 | 0.0155 |
| d33 | 0.0934 | 0.0858 | 0.2437 |
| d35 | 0.1612 | 0.1688 | 0.0108 |
| d41 | 0.0376 | 0.1344 | 0.2515 |
| Entrance pupil position | 1.1296 | 2.1122 | 3.4961 |
| Exit pupil position | −0.9235 | −1.0443 | −1.4031 |
| Front principal points position | 1.4749 | 1.9597 | 1.5997 |
| Back principal points position | 2.1897 | 1.4005 | −0.0081 |

TABLE 33

(Single lens data)

| Lens element | Initial surface number | Focal length |
|---|---|---|
| 1 | 1 | −23.2690 |
| 2 | 3 | 3.9159 |

TABLE 33-continued (Single lens data)

| Lens element | Initial surface number | Focal length |
|---|---|---|
| 3 | 5 | −3.9764 |
| 4 | 7 | 1.6500 |
| 5 | 9 | −0.4589 |
| 6 | 11 | 0.7149 |
| 7 | 13 | −1.5239 |
| 8 | 15 | 0.9373 |
| 9 | 17 | 1.5191 |
| 10 | 19 | −0.8523 |
| 11 | 22 | −4.0457 |
| 12 | 24 | −0.7585 |
| 13 | 26 | 0.6504 |
| 14 | 28 | 0.8229 |
| 15 | 30 | 0.6536 |
| 16 | 32 | −0.4031 |
| 17 | 34 | 1.1090 |
| 18 | 36 | −0.9831 |
| 19 | 38 | 1.4966 |
| 20 | 40 | −0.8788 |
| 21 | 42 | 1.3432 |

TABLE 34

(Zoom lens unit data)

| Lens unit | Initial surface No. | Focal length | Overall length of lens unit | Front principal points position | Back principal points position |
|---|---|---|---|---|---|
| 1 | 1 | 1.80021 | 0.33240 | 0.04886 | 0.16586 |
| 2 | 9 | −0.63396 | 0.19130 | 0.09012 | 0.14628 |
| 3 | 15 | 1.75062 | 0.41640 | −0.30938 | −0.18053 |
| 4 | 24 | 1.80359 | 0.18530 | −0.03014 | 0.04610 |
| 5 | 34 | 1.10897 | 0.05550 | −0.00158 | 0.02034 |
| 6 | 36 | −0.64817 | 0.17310 | 0.08198 | 0.11514 |
| 7 | 42 | 1.34316 | 0.04350 | −0.00897 | 0.01239 |

TABLE 35

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.70953 | −1.15162 | −2.53490 |
| 3 | 15 | 6.22981 | 5.09434 | −7.51658 |
| 4 | 24 | −0.22134 | −0.29746 | 0.11181 |
| 5 | 34 | 0.35997 | 0.34380 | 0.47604 |
| 6 | 36 | 2.99062 | 3.14031 | 3.32305 |
| 7 | 42 | 0.52739 | 0.52734 | 0.52706 |

The following Table 36 shows the corresponding values to the individual conditions in the zoom lens systems of each of Numerical Examples.

TABLE 36

(Values corresponding to conditions)

| | Numerical Example | | | | | | |
|---|---|---|---|---|---|---|---|
| Condition | 1 | 2 | 3 | 4 | 5 | 6 | 7 |
| (1) $\|(Y_W/f_W) \times F_{NOT} \times (f_T/f_W)\|$ | 2.349 | 2.348 | 2.112 | 4.374 | 2.371 | 3.352 | 3.970 |
| (2) $(D_{1W}+D_{2T})/f_W$ | 0.044 | 0.028 | 0.158 | 0.056 | 0.042 | 0.064 | 0.023 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system, in order from an object side to an image side, comprising:
a first lens unit having positive optical power;
a second lens unit having negative optical power; and
subsequent lens units, wherein
the first lens unit is composed of three or four lens elements,
the zoom lens system being provided with:
an aperture diaphragm;
an image blur compensating lens unit composed of one or more lens elements, which moves in a direction perpendicular to an optical axis to optically compensate image blur; and
a focusing lens unit composed of one or more lens elements, which moves along the optical axis in focusing from an infinity in-focus condition to a close-object in-focus condition, wherein
the subsequent lens units include the aperture diaphragm, the image blur compensating lens unit, and the focusing lens unit,
the image blur compensating lens unit and the focusing lens unit are provided on the image side relative to the aperture diaphragm, and
the following conditions (1) and (2) are satisfied:

$$1.8 < |(Y_W/f_W) \times F_{NOT} \times (f_T/f_W)| < 4.5 \tag{1}$$

$$0.001 < (D_{1W}+D_{2T})/f_W < 0.200 \tag{2}$$

where
$Y_W$ is a diagonal image height at a wide-angle limit, which is expressed by the following equation:

$$Y_W = f_W \times \tan(\omega_W),$$

$f_W$ is a focal length of the zoom lens system at the wide-angle limit, $f_T$ is a focal length of the zoom lens system at a telephoto limit, $\omega_W$ is a half view angle at the wide-angle limit, $F_{NOT}$ is F-number at the telephoto limit, $D_{1W}$ is an inter-apex distance between the first lens unit and the second lens unit at the wide-angle limit, and $D_{2T}$ is an inter-apex distance between the second lens unit and a lens unit provided closest to the object side among the subsequent lens units at the telephoto limit.

2. The zoom lens system as claimed in claim 1, wherein no lens element having negative optical power is provided between the image blur compensating lens unit and the focusing lens unit.

3. The zoom lens system as claimed in claim 1, wherein a lens unit provided closest to the image side has positive optical power.

4. The zoom lens system as claimed in claim 1, wherein a lens unit provided closest to the image side is fixed with respect to an image surface in zooming from the wide-angle limit to the telephoto limit at a time of image taking.

5. The zoom lens system as claimed in claim 1, wherein at least one of the image blur compensating lens unit and the focusing lens unit has negative optical power.

6. The zoom lens system as claimed in claim 1, wherein the subsequent lens units include at least three lens units.

7. The zoom lens system as claimed in claim 1, wherein the image blur compensating lens unit includes a cemented lens element.

8. The zoom lens system as claimed in claim 1, wherein the first lens unit is fixed with respect to an image surface in zooming from the wide-angle limit to the telephoto limit at a time of image taking.

9. The zoom lens system as claimed in claim 8, wherein the subsequent lens units include at least two lens units, and the at least two lens units as the subsequent lens units are fixed with respect to the image surface in zooming from the wide-angle limit to the telephoto limit at the time of image taking.

10. The zoom lens system as claimed in claim 8, wherein the aperture diaphragm is fixed with respect to the image surface in zooming from the wide-angle limit to the telephoto limit at the time of image taking.

11. The zoom lens system as claimed in claim 8, wherein a most object side lens surface of the focusing lens unit has a convex shape protruding toward the object side.

12. The zoom lens system as claimed in claim 8, wherein the aperture diaphragm, the image blur compensating lens unit, and the focusing lens unit are provided in order from the object side to the image side.

13. An interchangeable lens apparatus comprising:

the zoom lens system as claimed in claim 1; and a lens mount section which is connectable to a camera body including an image sensor for receiving an optical image formed by the zoom lens system and converting the optical image into an electric image signal.

14. A camera system comprising:

an interchangeable lens apparatus including the zoom lens system as claimed in claim 1; and a camera body which is detachably connected to the interchangeable lens apparatus via a camera mount section, and includes an image sensor for receiving an optical image formed by the zoom lens system and converting the optical image into an electric image signal.

\* \* \* \* \*